US009851021B2

(12) United States Patent
Frassinelli et al.

(10) Patent No.: US 9,851,021 B2
(45) Date of Patent: Dec. 26, 2017

(54) METHOD FOR REMOVING FROM A TERRAIN A BURIED PIPE AND A CUTTING MACHINE USED FOR ACTUATING THE METHOD

(71) Applicant: ENERECO S.p.A., Fano (PU) (IT)

(72) Inventors: Alfredo Frassinelli, Cartoceto (IT); Aurelio Simoncelli, Pesaro-Urbino (IT); Franco Iacucci, Pesaro-Urbino (IT)

(73) Assignee: ENERECO S.P.A., Fano (PU) (IT)

( * ) Notice: Subject to any disclaimer, the term of this patent is extended or adjusted under 35 U.S.C. 154(b) by 263 days.

(21) Appl. No.: 14/391,288

(22) PCT Filed: Apr. 9, 2013

(86) PCT No.: PCT/IB2013/052812
§ 371 (c)(1),
(2) Date: Oct. 8, 2014

(87) PCT Pub. No.: WO2013/153508
PCT Pub. Date: Oct. 17, 2013

(65) Prior Publication Data
US 2015/0139734 A1 May 21, 2015

(30) Foreign Application Priority Data
Apr. 12, 2012 (IT) .......................... BO2012

(51) Int. Cl.
*F16L 1/028* (2006.01)
*B24C 3/32* (2006.01)
(52) U.S. Cl.
CPC ................ *F16L 1/028* (2013.01); *B24C 3/32* (2013.01)
(58) Field of Classification Search
CPC . F16L 1/028; F16L 1/032; F16L 1/036; F16L 55/164; F16L 55/1645
(Continued)

(56) References Cited

U.S. PATENT DOCUMENTS 1,132,690 A * 3/1915 Sieben .................... B08B 9/051
15/104.12
4,504,204 A * 3/1985 Koga .................. F16L 55/1645
425/11

FOREIGN PATENT DOCUMENTS

CH 656330 * 6/1986
DE 10157642 C1 4/2003
(Continued)

*Primary Examiner* — Sunil Singh
(74) *Attorney, Agent, or Firm* — R. Neil Sudol; Henry D. Coleman

(57) ABSTRACT

A method for removing from a terrain (T) a buried longitudinal portion (P) of a substantially cylindrical pipe made of a ductile material and of a type suitable for use in oil pipelines, water pipelines, gas pipelines or the like, which method comprises steps of: digging at least an excavation (S1, S2) in the terrain (T), at a longitudinal end (P1, P2) of the buried portion (P) to be removed, such as to make the end accessible; making at least a through-cut in the wall of the portion (P) of pipe to be removed, so as to obtain at least a strip having two opposite longitudinal edges which define a width of the strip that is smaller than a circumference of a wall of the portion (P) of pipe; taking the strip and removing it from the terrain, passing it through the excavation (S1, S2); and obstructing the underground volume that has housed the portion (P) of the pipe (P) and the excavation (S1, S2) with filler material. The invention also relates to a cutting machine comprising: a cutting part (11), entirely insertable in said portion of pipe (P), comprising cutting means (41) for making at least a through-cut in the wall of the portion of pipe; and a support part (12), for supporting the cutting part (11), also entirely insertable in the portion of pipe (P), and comprising abutting means (31, 32, 33) for contemporaneously abutting, at a plurality of points, an internal surface of the portion of pipe so as to engage the machine (1) to the portion of pipe (P) to be cut.

17 Claims, 14 Drawing Sheets

(58) Field of Classification Search
USPC .............. 15/104.31, 104.05; 405/156, 184.1, 405/184.3
See application file for complete search history.

(56) References Cited

FOREIGN PATENT DOCUMENTS

| | | | |
|---|---|---|---|
| DE | 102007044959 A1 | | 1/2009 |
| EP | 0444974 A1 | | 9/1991 |
| FR | 2684742 A1 | | 6/1993 |
| FR | 2841319 A1 | | 12/2003 |
| GB | 2200970 A | * | 8/1988 |
| GB | 2273142 A | | 6/1994 |
| JP | 2-300584 | * | 5/1989 |
| JP | 2-30890 | * | 2/1990 |
| JP | 6-121972 | * | 5/1994 |
| RU | 2276754 | * | 5/2006 |

* cited by examiner

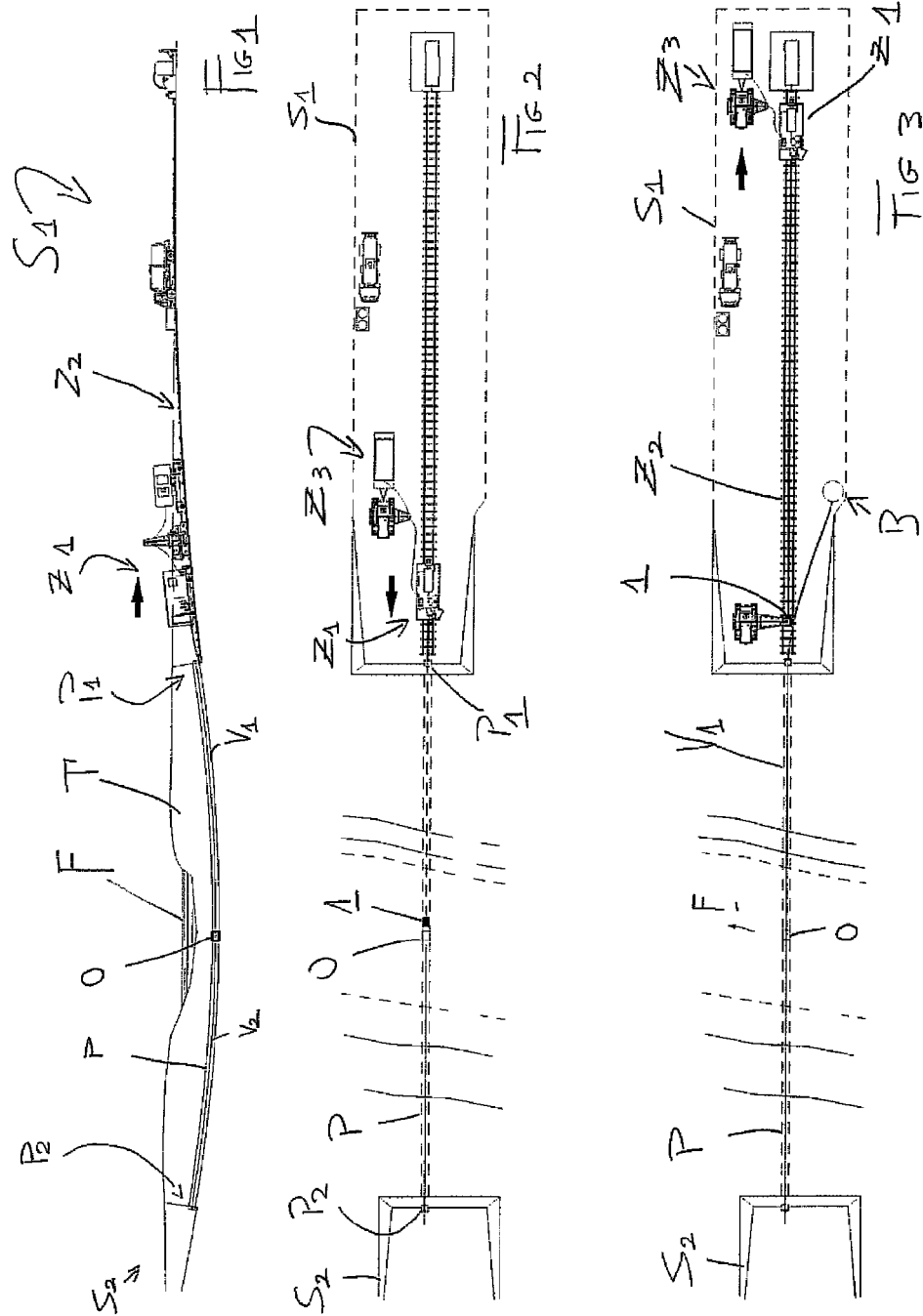

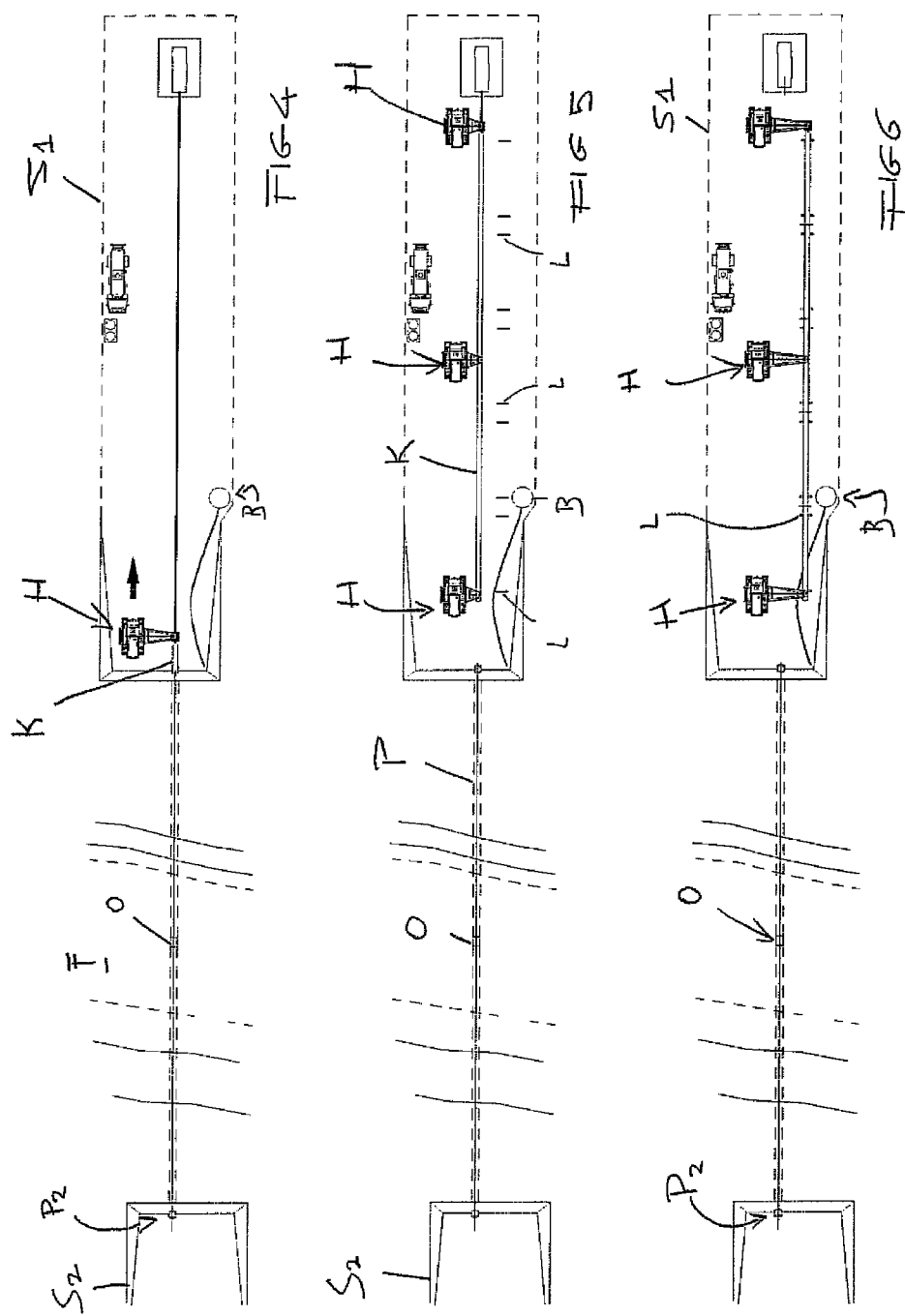

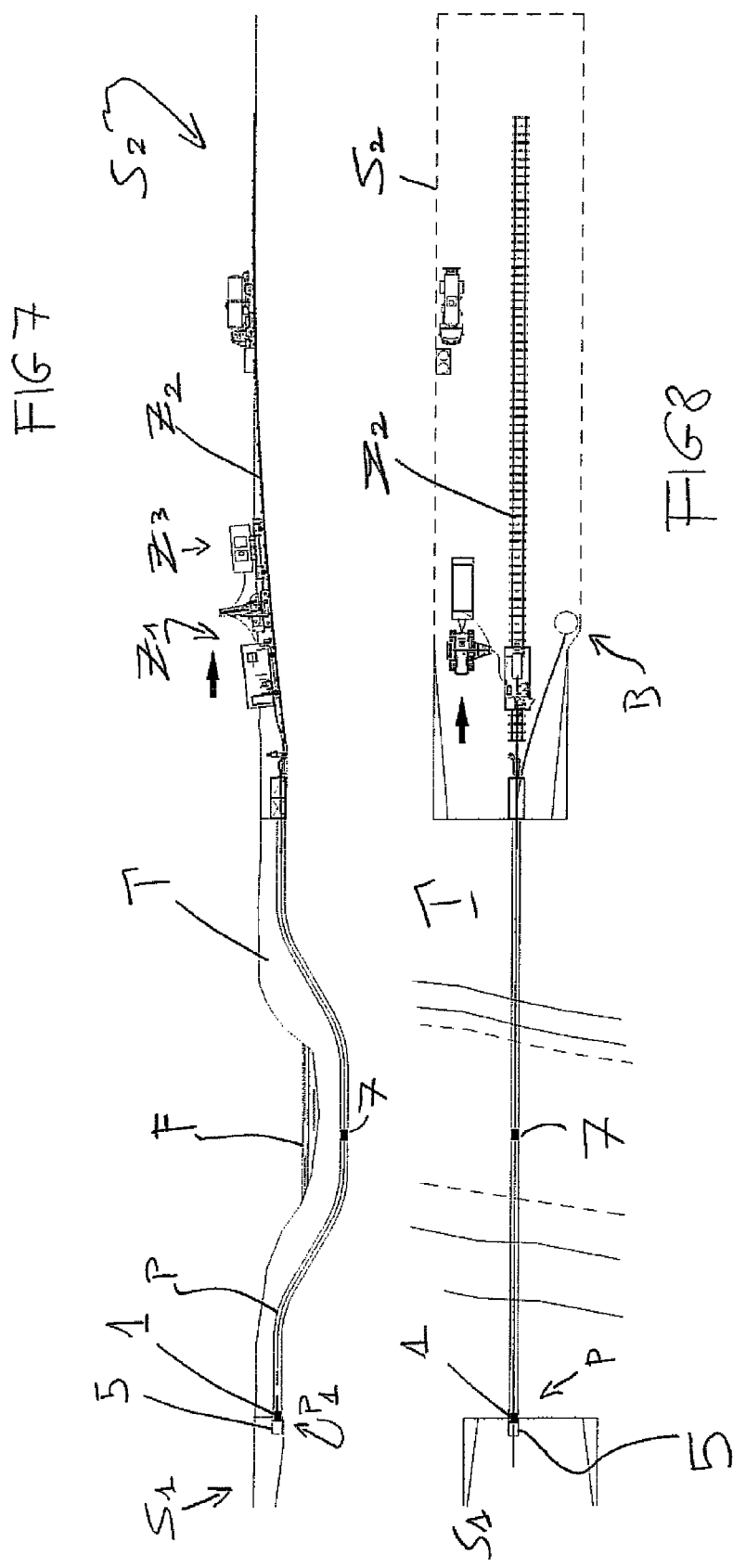

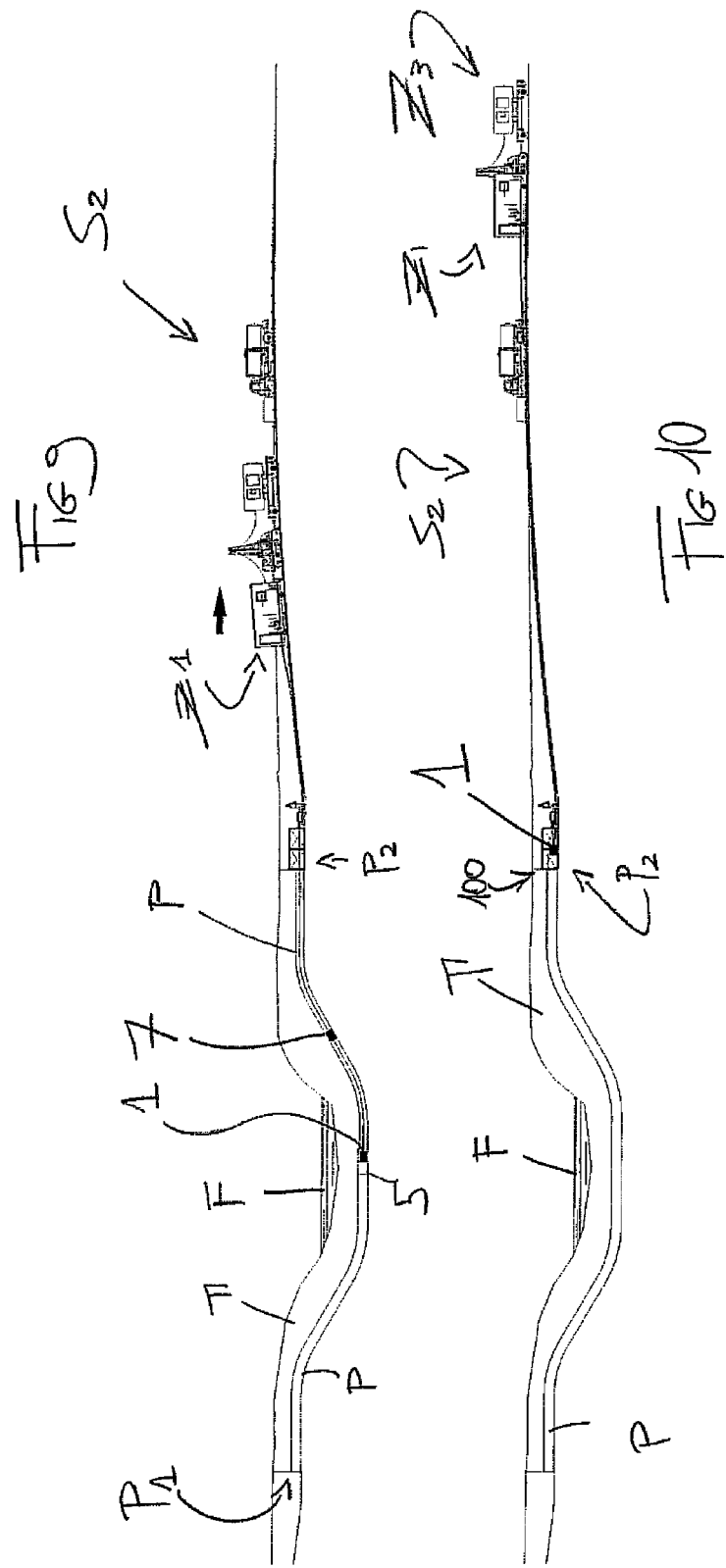

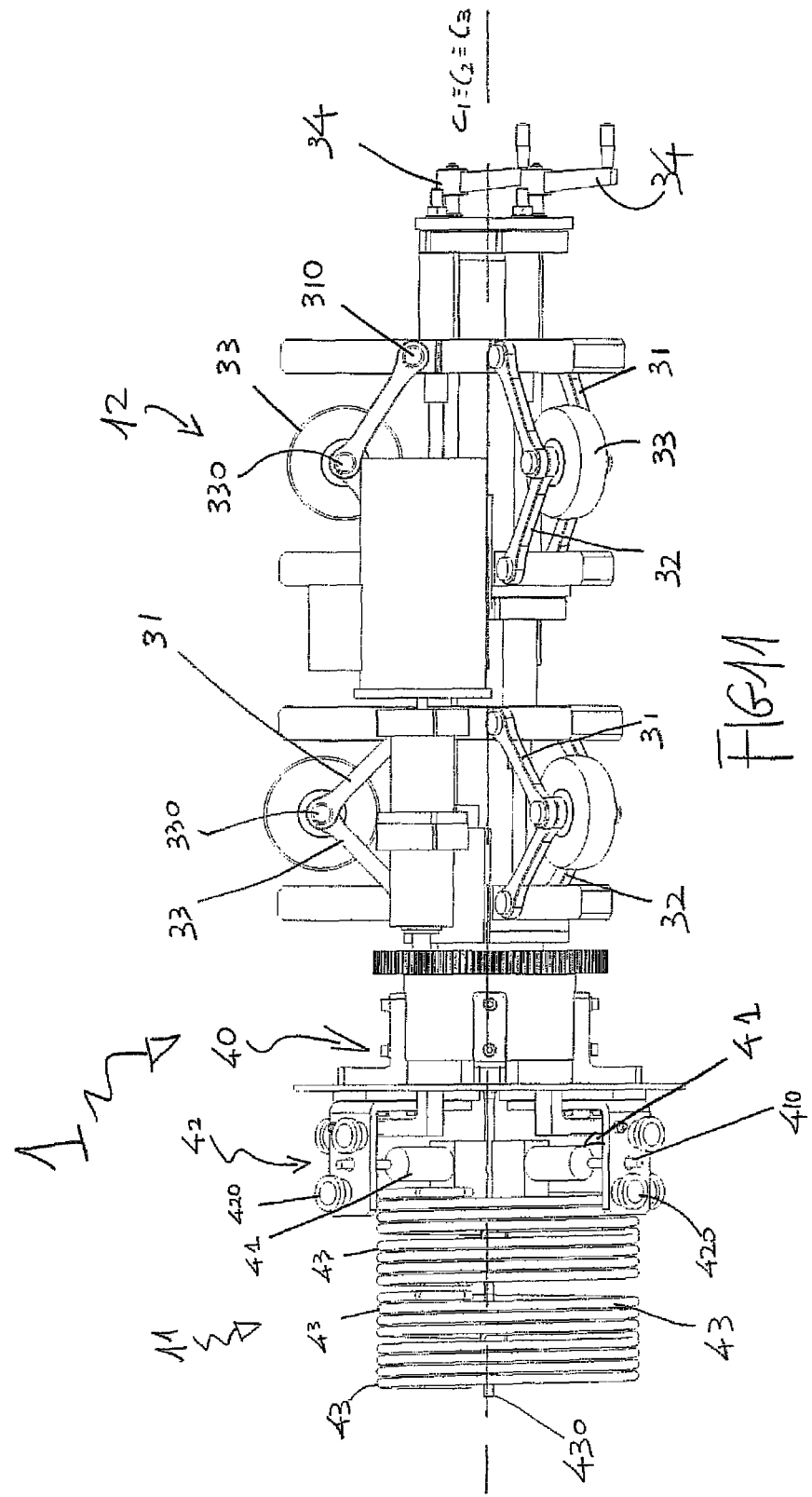

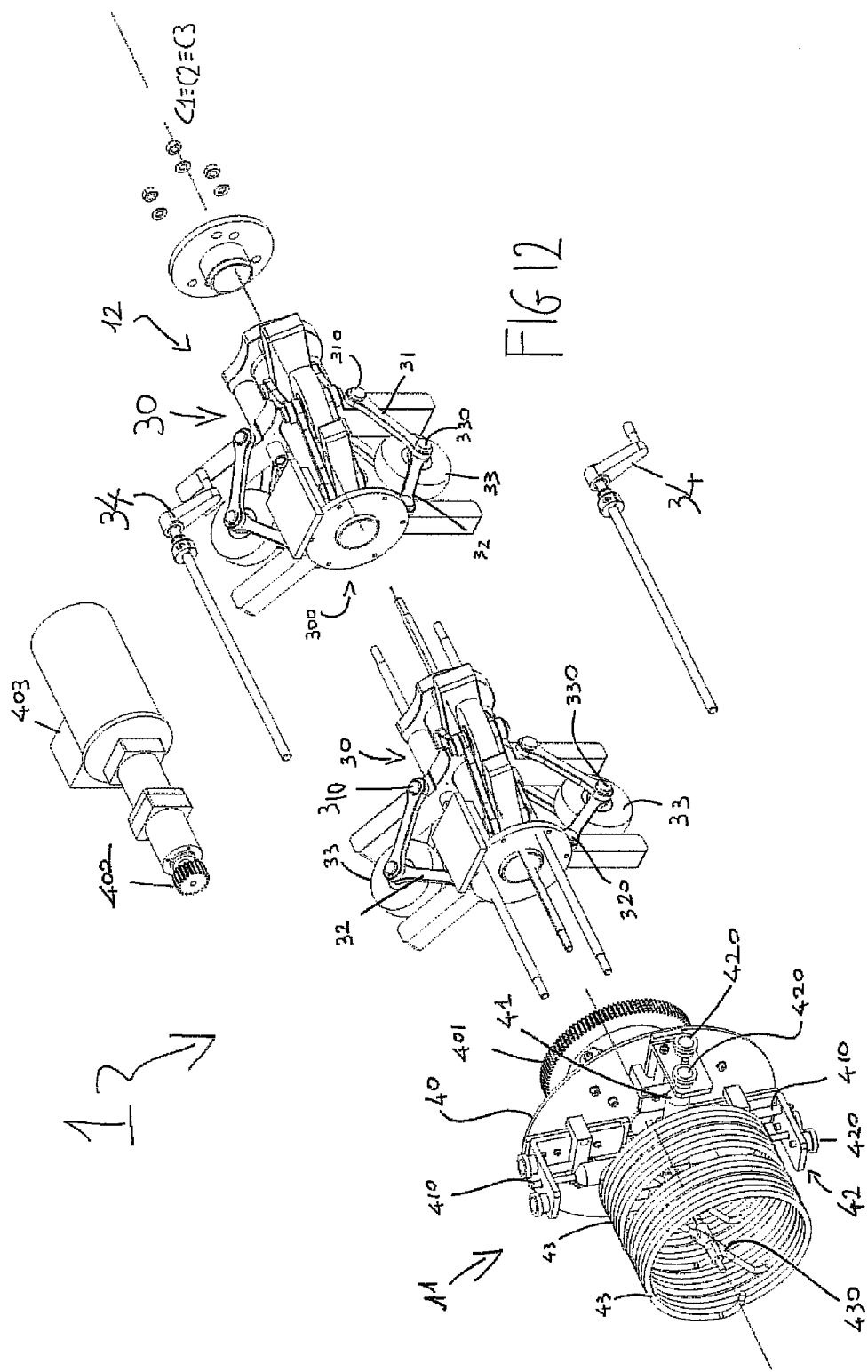

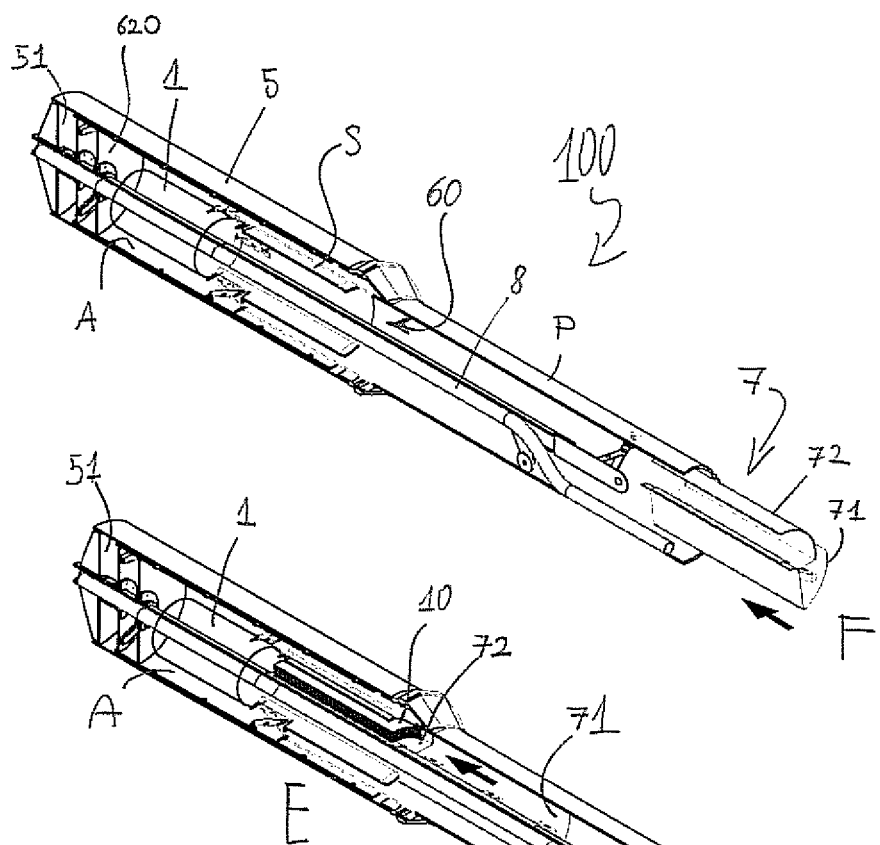
FIG 18
FIG 19
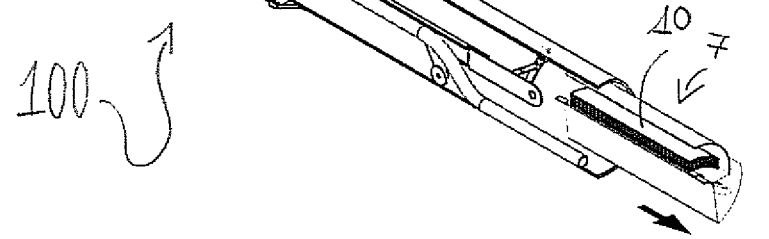
FIG 20

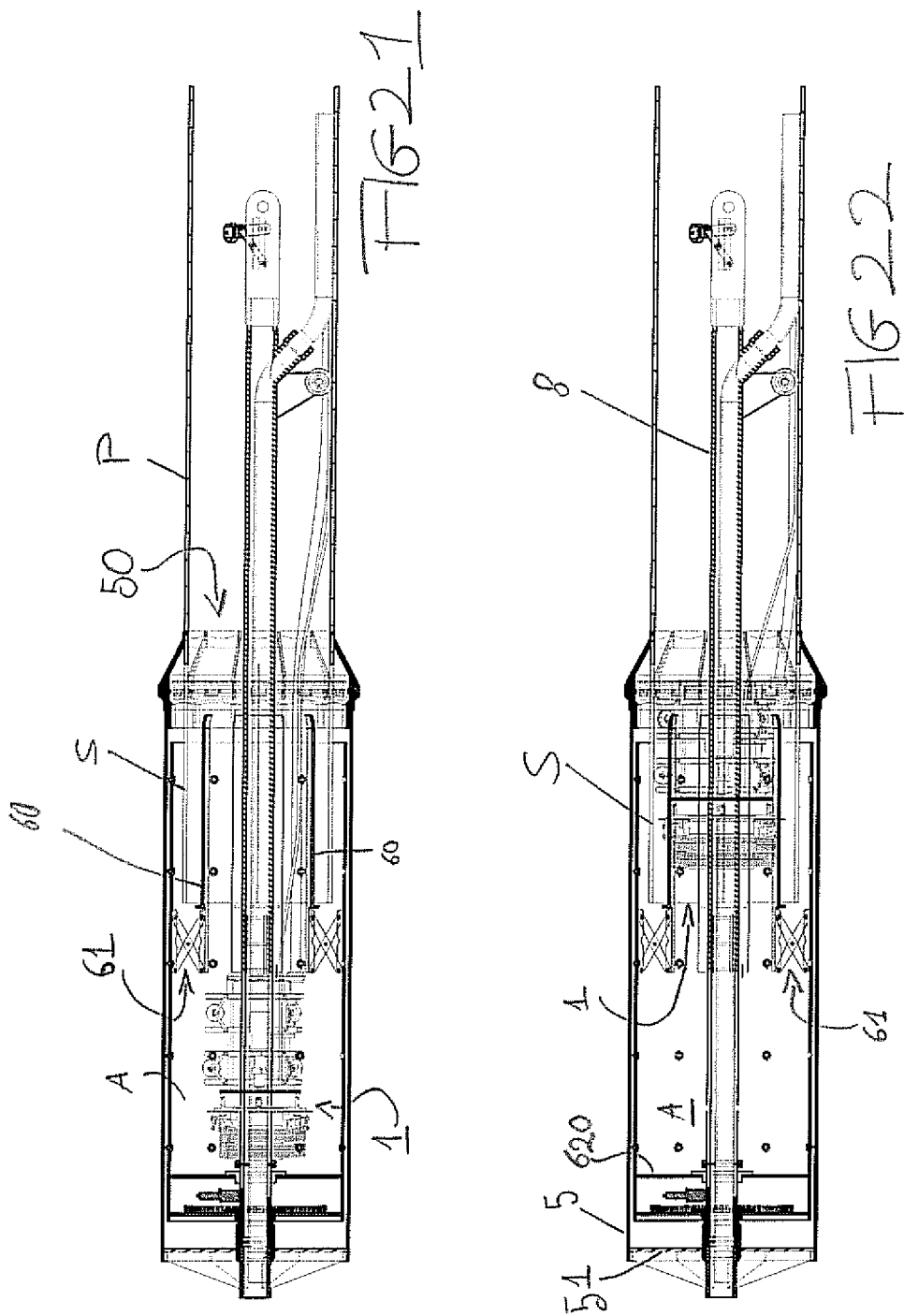

METHOD FOR REMOVING FROM A TERRAIN A BURIED PIPE AND A CUTTING MACHINE USED FOR ACTUATING THE METHOD

FIELD OF INVENTION

The present invention relates to the technical sector of buried pipes of gas pipelines, oil pipelines and the like.

In detail, it relates to pipelines made of steel, polymers or other ductile materials.

In still greater detail, these ductile materials are to be distinguished for example from the cement or stoneware of which drains are made.

DESCRIPTION OF THE PRIOR ART

When a buried pipe is no longer used because it has finished its work cycle, what will happen to it becomes a problem.

Owners of these pipelines have an interest in removing them from the terrain so as to avoid legal uncertainties connected to the use of overlying land above the pipeline or the maintenance of the areas the pipeline crosses.

Where possible, an open trench is created, after which the pipe is removed and the trench filled once more.

However, there are zones crossed by pipelines that are unusual in which an open-trench removal of the portions of pipeline crossing them is not practicable.

For example, in a case in which the conduit passes below a banked water course, an intervention using an open trench might lead to a weakening of the banks.

In other cases, the geological structure of the crossing zone is such that a trenched intervention might provoke landsliding phenomena.

Further, there might be administrative reasons, or reasons connected to landscaping questions, which dissuade the owners from performing excavation using trenching.

At present, in these circumstances and following agreements between owners and public bodies in the above-cited unusual zones, the portions of conduit are left in the terrain, sometimes following a blocking-up thereof, with the disadvantage that the owners are obliged to endure a situation of legal uncertainty as mentioned above.

To today, the only known processes enable adding or replacing a new portion of pipe to a residual portion, i.e. not extracted from the terrain, of the worn pipe.

For example a process is known which is commonly called "pipe splitting".

This method includes digging two ditches at the ends of the portion of pipe which has not been extracted, such as to uncover the ends.

After this, a splitting element is located in one of the ditches, directly at the end mouth of the residual portion of the pipe, while a drawing device, such as for example a winch, is situated at the other ditch and connected to the splitting element by means of a cable, a chain or other similar transmission means of the motion.

The splitting element comprises a main variable-section body, for example in the shape of an ogive, tapered in the internal direction of the portion of pipe, but with an increasing section in the opposite direction, up to having a greater size than the aperture of the pipe itself.

Further, the splitting element comprises a cutting member located above the main body and arranged thereon rather like a dorsal fin or a crest.

A new section of pipe is fixed to the tail of the splitting element, at the largest section thereof.

When the winch is activated to draw the splitting element, and therefore also the new section of pipe, the drawing splitting element carries out a cutting of the residual portion of the old pipe by means of the cutting member, which enables a splitting thereof following the forcible insertion of the main body, to enable passage of the new section of pipe into the residual portion of the worn conduit.

The cutting member cuts the residual portion starting from an end edge, the member being located transversal to the wall of the pipe portion, with the edge of the cutting element also cutting the terrain which overlies the portion of pipe itself.

At the end of the known process, there is the availability of a new portion of pipe ready for use, which portion is housed in the residual portion of the old pipe, now cut and split.

This known method can be used only if the owners are interested in continuing to use the line crossed by the old conduit, but the method cannot obviate the above-cited disadvantage of legal uncertainty if the line is no longer of interest; note that the abandoned pipeline in the terrain constitutes to all effects a true and proper waste element.

SUMMARY OF THE INVENTION

The aim of the present invention is to obviate the above-explained drawback in the prior art, and others besides, using a process for removing a buried longitudinal portion of pipe from the terrain, which portion is substantially cylindrical and made of a ductile material, and making available a machine for making cuts in the wall of the buried portion of pipe.

In the more general aspects thereof, the method comprises following fundamental steps, which can either be actuated in succession or in such a way that at least some of them are actuated contemporaneously entirely or in part:

a) digging at least an excavation in the terrain, at a longitudinal end of the buried portion to be removed, such as to make the end accessible;

b) making at least a through-cut in the wall of the portion of pipe to be removed, so as to obtain at least a strip having two opposite longitudinal edges which define a width of the strip that is smaller than a circumference of a wall of the portion of pipe;

c) taking the strip and removing it from the terrain, passing it through the excavation; and d) obstructing the underground volume that has housed the portion of the pipe and the excavation with filler material.

In the following, precise modes of application of the method of the invention will be set out, but it noted here that as it involves cutting the wall of the portion of pipe such as to obtain the strip configured as defined above, following the cut the structural sturdiness of the portion of pipe diminishes to the point that it no longer constitutes a rigid entity interred in the terrain, but a flexible strip that can be drawn without snagging in the terrain, then to be removed via the trench or trenches as mentioned above.

Therefore in using the invention it is no longer necessary to abandon the portion of pipe in the terrain in the above-mentioned special crossing zones.

It follows that the drawbacks relating to legal uncertainty, which at present afflict the owners of the pipelines and which are not obviated by the prior art, are totally obviated by the invention.

Step b above is preferably carried out by making on the wall of the portion (P) to be removed at least a through-cut having a helical development with respect to a central longitudinal axis of the portion, such as to obtain a strip having a helically-developing shape.

The helical shape is such that on one side the strip can function as a bearing structure for the wall of earth surrounding the buried volume receiving the portion of pipe, and can provide a residual structural resistance which prevents the collapsing of the wall of earth.

Further, the helical spring shape enables the strip to stretch or twist when it is drawn along a curved buried volume, facilitating the passage thereof along the walls of the buried volume and thus enabling an easier extraction.

In practice, the invention constitutes to all effects a trenchless method, i.e. without a ditch opened at a ground level, able to completely remove the portion of buried pipe without leaving residues thereof on site.

As will emerge even more clearly in the following, the aims of the invention are attained thanks to the fact that the cutting machine of the invention comprises, in the more general aspects thereof:

a cutting part, entirely insertable in said portion of pipe, comprising cutting means for making at least a through-cut in the wall of the portion of pipe; and a support part, for supporting the cutting part, also entirely insertable in the portion of pipe, and comprising abutting means for contemporaneously abutting, at a plurality of points, an internal surface of the portion of pipe so as to engage the machine to the portion of pipe to be cut.

Thus, by using the cutting machine, the buried portion of pipe can be cut such as to fashion the strip defined above, thanks to the use of the cutting means.

BRIEF DESCRIPTION OF THE DRAWINGS

In the following the specific embodiments of the invention are set out and described with the aid of the accompanying drawings, in which:

FIG. 1 is a schematic view in vertical section, of a crossing zone of the buried tubular portion, during the carrying-out of the first embodiment of the method of the invention;

Figure 13:
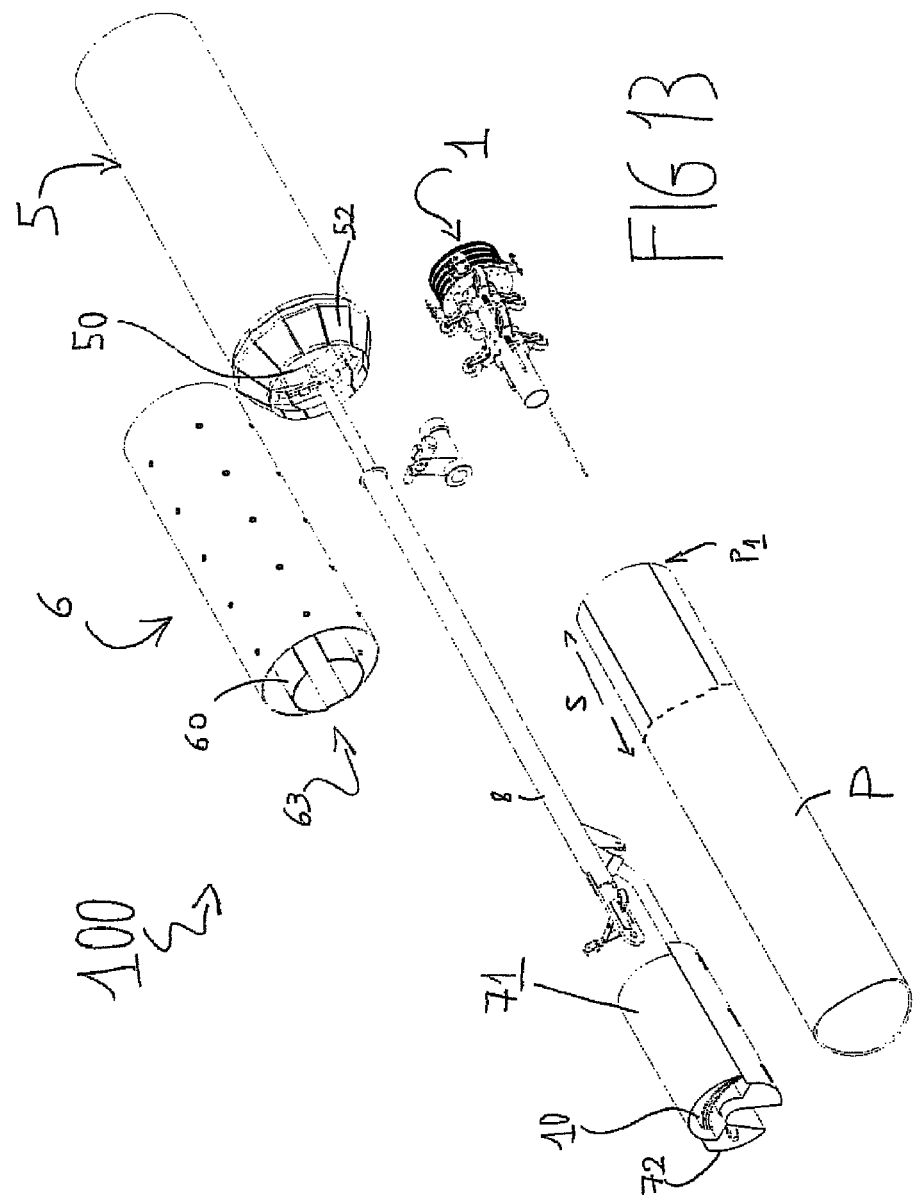
Figure 14:
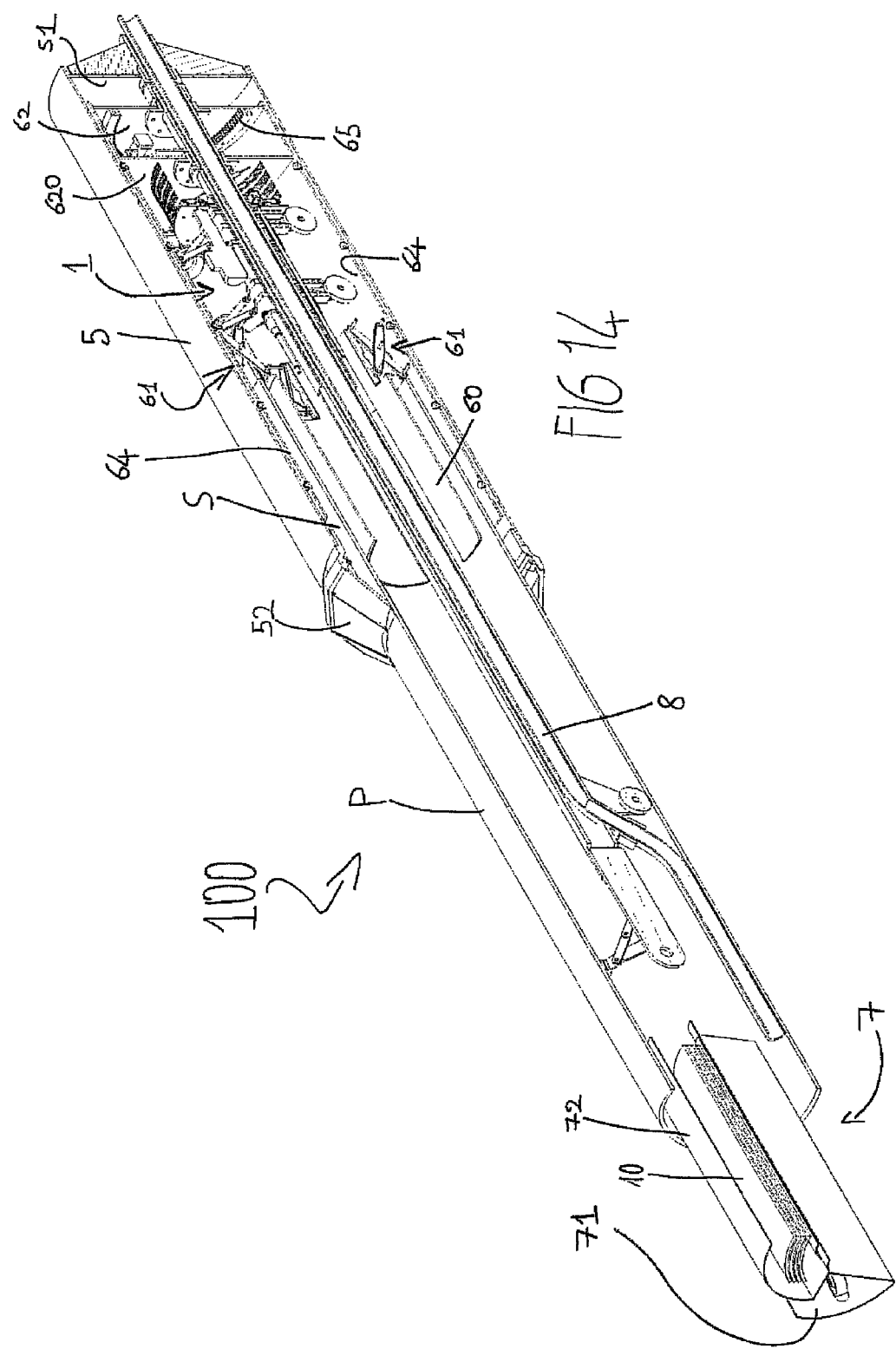
Figure 15:
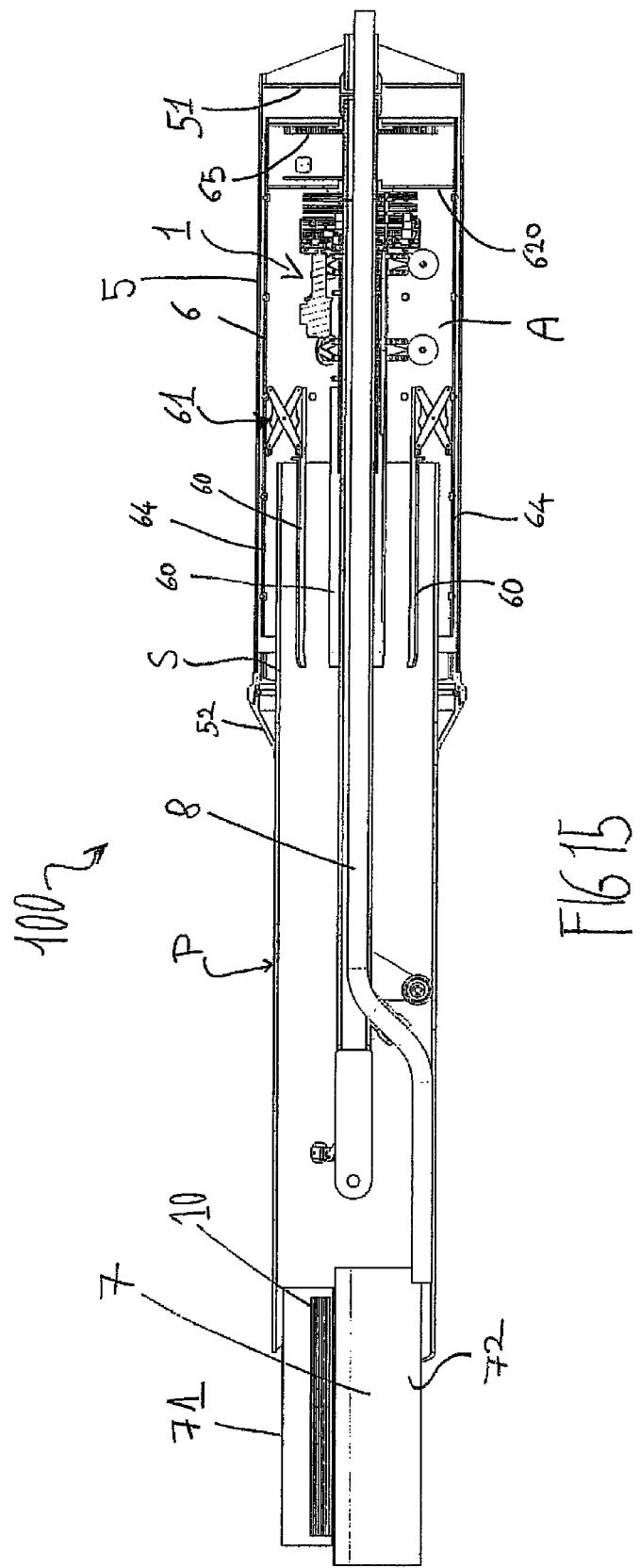
Figure 16:
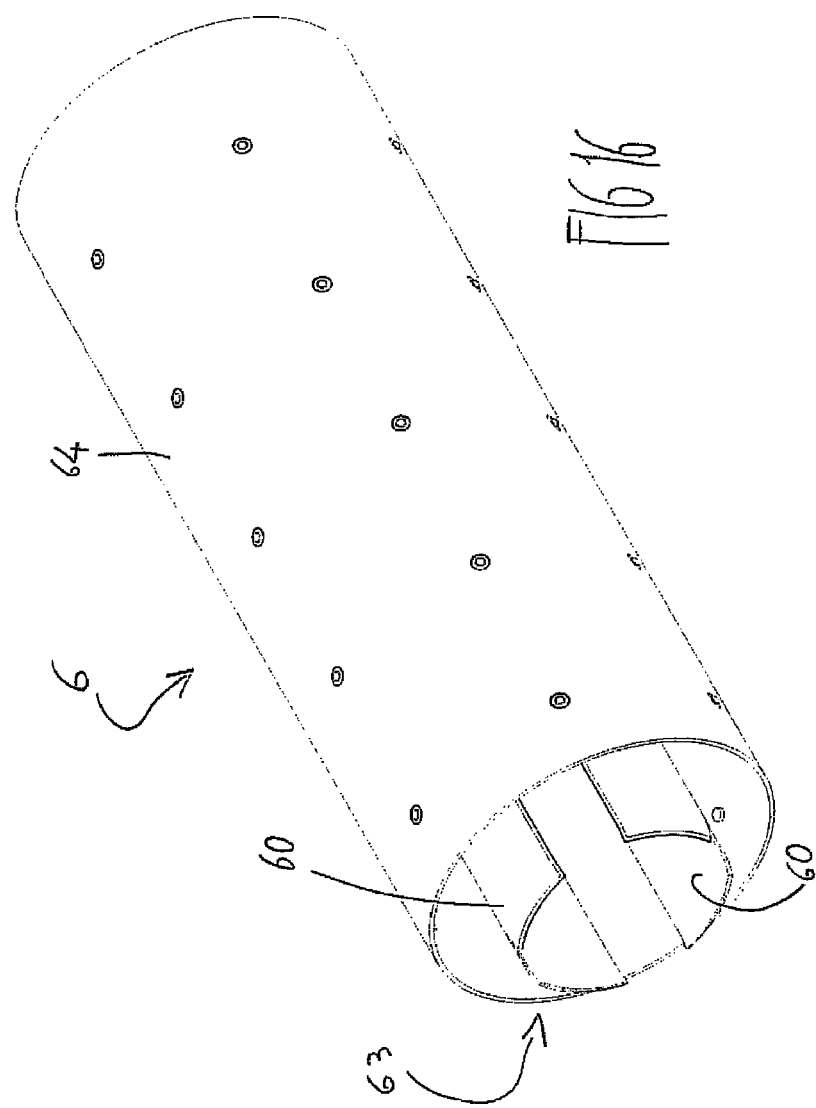
Figure 17:
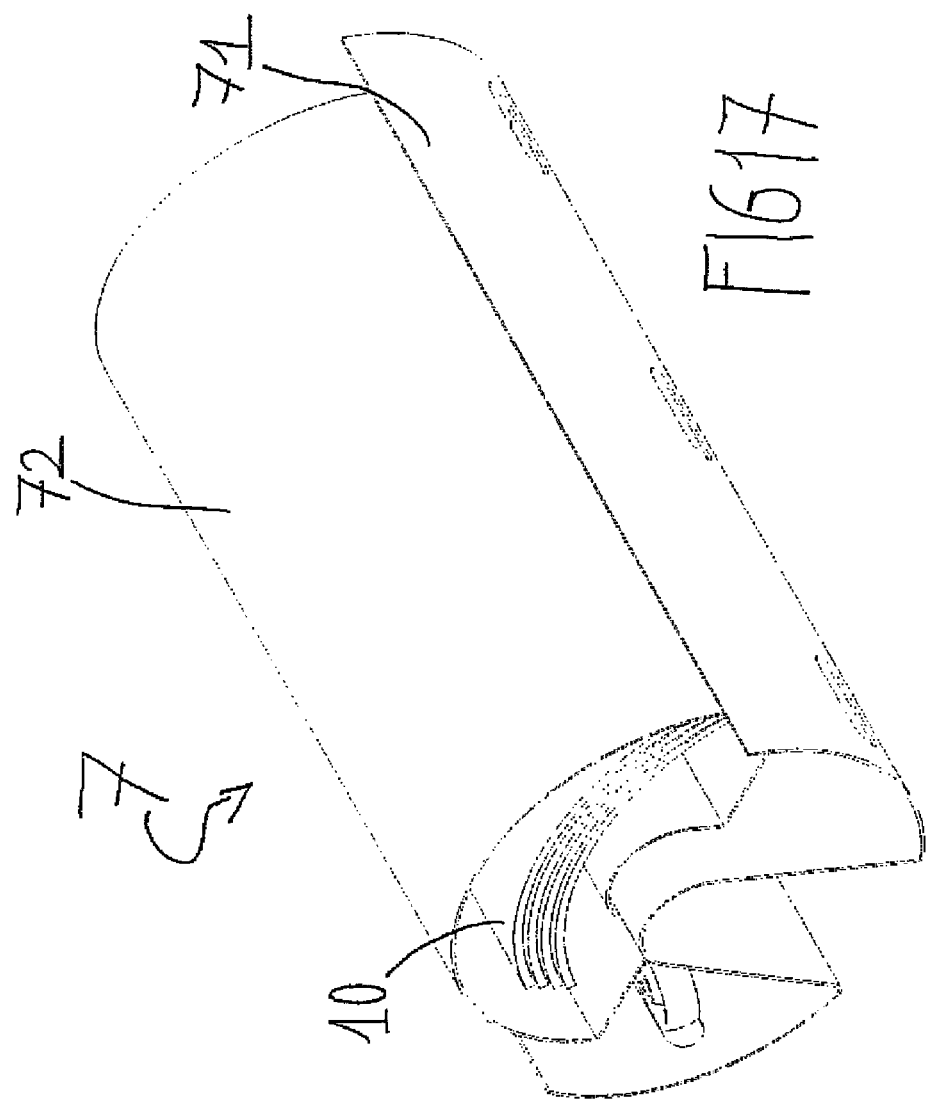

figures from 2 to 6 are schematic views from above of the crossing zone in different steps of the first embodiment of the method;

figures from 7 to 10 are schematic views illustrating steps of the method according to a second embodiment for removing from the earth a buried portion of a pipe when the pipe exhibits significant bends;

FIG. 11 is a lateral view of the cutting machine of the invention;

FIG. 12 is an axonometric exploded view of the cutting machine of the invention;

FIG. 13 is an axonometric exploded view of the removal system comprising the machine of the two preceding figures;

FIGS. 14 and 15 are respectively an axonometric view and a lateral view of a vertical section of the removal system of the preceding figure;

FIG. 16 is an axonometric view of the gripping device of the removal system of the preceding figures;

FIG. 17 is an axonometric view of the transport shuttle of the removal system of the preceding figures;

figures from 18 to 20 are schematic axonometric views of a vertical section of the removal system in different moments of the activation of the shuttle of the preceding figure; and figures from 21 to 25 are schematic representations taken according to a lateral view of a section of the removal system, at different moments in the use thereof for carrying out the second embodiment of the method, in which the cutting machine is represented in its entirety for reasons of clarity of representation.

DESCRIPTION OF PREFERRED EMBODIMENTS

The method of the invention is disclosed starting from a situation in which the removal of the pipe has been performed, for example by digging a trench, only upstream and downstream of one of the crossing zones in which the prior-art type of removal is not practicable, for example due to the crossing of a banked water course F, schematically denoted in figures from 1 to 10.

In this crossing zone, then, below the water course F there is a portion of buried pipe P, i.e. interred in the terrain T, which must be removed without opening a trench, i.e. trenchless, for the reasons explained herein above.

As is known, pipes are tubes having a substantially circular section; in practice, for known reasons by the expert in the sector, the section is not exactly constant in shape (i.e. the profile) over the whole length, but which might have oval parts or elliptical parts.

In the present description, for reasons of simplicity and with no loss in generality, reference will be made to an embodiment in which a portion of pipe P formed by a circular-section cylindrical part, where not explicitly otherwise indicated, which wall is curved downwards, in the sense of the length, and crossed in a length thereof by an ideal central axis.

As already explained, the method of the invention, in its different embodiments, can comprise a step of making a first and a second cavity S1, S2 in the terrain, respectively at a first and a second longitudinal end P1, P2 of the buried portion P to be removed, such as to make the ends accessible.

Some embodiments might function efficiently by making a single ditch at a single end thereof.

The digging of the cavities S1, S2 is important because it enables reaching the portion of pipe P to be removed, and enables having an access for removing from the terrain T the distinct pieces into which the pipe portion P is cut; further, given that the two ends P1, P2 of the portion of pipe define two access mouths to the inside thereof, the two cavities S1, S2 enable inserting the cutting machine 1 of the invention, or other means, in the portion of pipe P, as will be explained at length in the description of the functioning of the machine 1.

The worksite or worksites are established at the cavities S1, S2 where the pipe-removing personnel is working, and includes containers, generators and tanks, and in general the tools are made ready and the common activities known to experts in the sector of oil-ducts, gas-duct, aqueducts and the like are carried out.

Returning to the method of removal, it comprises two main embodiments.

The first embodiment is particularly suitable for the removal of those portions of pipe P which have a small curvature, for example a substantially circumferential curvature and/or which follows the elastic curvature of the portion P (see figures from 1 to 6).

This embodiment has among its advantages the relative rapidity and simplicity of actuation.

To describe it, initially reference will be made to a version thereof used for extracting long portions of pipe (about 300 meters and beyond), subsequently indicating in what the variant consists for shorter portions.

To carry out the version for long pipes, before cutting a pipe P to remove a portion thereof, it is first necessary to provide an obturating means O in one of the two cavities S1, S2, which obturating means O can obstruct a section of the portion of pipe P, and having in use a width equal to the size of the section obstructed and a length of its own.

The obturating means O are of known type, often having a torpedo shape, and substantially comprise a hydraulic element the walls of which, following the activation, are adhered to the internal surface of the walls of the portion of pipe P, such as to sealingly obstruct a section (and thus function as a cap); they are also provided with a cable or like linear drive transmission means, such as to recall them from the position in which they have been inserted in the portion P.

The obturating means O are mainly necessary because filler material introduced underground into the space occupied by the pipe portion being removed is of the initially-fluid type, and is able to solidify in time (even over several days); this type of material is chosen because it facilitates the obstruction operations of the underground volume which has housed the portion of the pipe P, and further facilitates the extraction.

The fluid material can be for example bentonite mud, or any type of stabilised mud comprising aggregate material such as sand, silt, lime or the like, and a bond such as quicklime or the like.

It is significantly preferred for the fluid filler material to be eco-compatible.

Using the obturating means O which functions as a cap enables separating the actuation of the method into two parts, defining two distinct longitudinal sections of the portion of pipe P, to be removed at different times, as will be explained in the following, thus enabling extraction from the terrain of even very long portions of pipe.

The following steps are also carried out before step b:
  making at least a through-cut at a wall of a section of the portion P of pipe, destined to be obstructed by the obturating means O, which cut extends over a length of the portion P of pipe that is equal at least to the length of the obturating means in use; and
  inserting the obturating means O in the portion P of pipe, such that it obstructs the section at which the cut has been made, so as to define, in the portion P of pipe, a first and a second volume V1, V2 that are fluid-dynamically isolated, i.e. sealedly closed one with respect to the other (see FIG. 1).

The reasons for which the preliminary cut is made before inserting the obturating means O will be clarified in the following.

Further, more than one preliminary cut can be made, instead of one, of which more in the following.

At this point, a first part of step b is carried out, making a closed through-cut, which is incident and transversal to the preliminary cut performed at the obstructed section, such as to select the portion of pipe P by separating the part which contains the first end from the one that contains the second end and the obstructed section (FIG. 2), such as to obtain in practice two lengths.

The closed cut is preferably a circular cut located in a transversal plane to the portion of pipe P.

It is clear that in the method of the invention the steps of cutting can be carried out by using the machine 1 of the invention, and however the use thereof is not necessary for the realization of the method, which has inventive characteristics that are not dependent on the choice of the means used for making cuts in the wall of the portion of pipe.

However, for reasons of clarity, in the figures illustrating the method (FIGS. 1 to 6) the machine 1 is schematically indicated such that the positioning thereof in the portion of pipe P or the cavities S1, S2 makes the carrying-out of the method of the invention more clearly comprehensible.

In a following part of the present application, these figures will be referred-to again during the description of the functioning of the cutting machine 1 of the invention.

The first part of step b. continues by making at least a through-cut on the wall circumscribing said first isolated volume V1, which through-cut extends said closed cut up to the first longitudinal end P1 (see FIG. 3).

Instead of a single through-cut, for example helical as mentioned above, a plurality of cuts can be made, as more fully explained in the following.

In greater detail, if a single helical cut is made in the wall of the portion of pipe P which surrounds the first volume V1, a single helical strip is obtained which has the qualities as specified herein above.

If a plurality of cuts is made, either straight or helical, a plurality of strips is obtained which constitutes in all aspects a plurality of distinct pieces.

Thus, there is more than one way in which the cuts can be made, and this will be illustrated in a following paragraph, at the end of the description of this version of the method.

Thereafter, filler fluid is poured into the first volume (FIG. 3) and, at the same time or subsequently, a first part of step c. is carried out, where the strip obtained in the first part of step b. is removed from the terrain (FIG. 4).

Figures from 3 to 6 denote a mixer station B, part of the worksite, used for releasing, by force of gravity, the filler fluid through the mouth of the first end P1 of the portion of pipe P.

It is preferable for the filler fluid to be inserted contemporaneously with the extraction operations, as the filler material also serves to give structure or support to the buried volume, as after the cutting operations the portion of pipe has 'structural resistance ability, and is therefore less efficiently able to support the weight of the overlying terrain T; this is more especially significant after one or more of the distinct pieces have been removed by sliding them out through the cavity S1.

In detail, FIG. 4 indicates the moment in which a piece K is being extracted (in this description the piece is also referred-to as a strip) from the pieces obtained in the above-indicated way, passing through the first cavity S1, for example by means of one or more vibrating drawing heads H (or "simple"), possibly borne by self-propelling machines (e.g. tracked), or by other means suitable for drawing the pieces of pipe.

FIG. 5 shows the moment in which the whole piece K is removed from the ground and is in the first cavity S1 and, in FIG. 6, it can be seen how the piece K is eased onto special supports L, for example made of wood.

As already mentioned in more general terms, the actions shown in FIGS. 4-6 are reiterated for all the pieces K previously obtained (which can be one or more than one) and therefore a first longitudinal tract (or length) of the buried portion P has been removed.

In order to be able to remove also the remaining section (the one which substantially includes the second volume V2 and the section comprising the obturating means O), as an expert in the sector might comprehend, it may be necessary to set up the worksite as for the first cavity S1 to the second cavity S2.

At this point, a second part of step b. is actuated, in which at least a through-cut is made on the wall which surrounds the second isolated volume V2, which cut prolongs the cut (or cuts) made at the obstructed section up to the second longitudinal end P2, thus obtaining at least a strip.

It can therefore be understood how it is necessary first to make the cut or cuts in the section destined to house the obturating means O, as this section too is removed from the terrain and in any case, after insertion of the obturating means there would be no space for making any cut at all.

When the preliminary cut is made in the section which has to house the obturating means O, in the end thereof placed at or before the second volume V2, it is preferably prolonged transversally to the central axis of the portion of pipe P (the prolongation being a few degrees or fractions of degrees), such that during the second part of step b, it is easier to carry out the through-cut which continues (i.e. prolongs) the preliminary cut of the obturated section.

Then the obturating means O is removed from the portion of pipe P by passing it through the second end P2 (for example pulling it by the cable) and then a second part of step c is carried out, in which the strip (or the separated pieces, in the case of several cuts) obtained at the end of the second part of step b is removed from the terrain and at the same time or after, filler fluid is poured into the underground volume which has house the portion of pipe P removed or which is being removed (the latter actions are not illustrated as they can be understood from the previously-described figures).

At this point given that there is no longer a fluid-dynamic insulation between the two volumes, clearly there is a single buried volume which must be filled sufficiently because once the fluid has solidified it is completely obstructed.

It is clear that as the piece or pieces K are extracted preferably by pulling them from an end, it is only necessary to make sure that before having removed all of them a terminal portion thereof is free and accessible for gripping.

There are principally two modes in which the single cut or the through-cuts of step b of the method are preferably carried out (except those carried out in a transversal plane which serve to divide the portions of pipe P to be divided into longitudinal portions.

These modes are in particular related to the first embodiment of the method but are principally applicable even in the second embodiment described in the following or other embodiments.

In the preferred mode, a through-cut is made on the wall (or walls, after the separation into two parts of the portion of pipe P), which through-cut has a helical development with respect to the central longitudinal axis of the portion, such as to obtain the strip having a helically-developing shape.

The advantages of the use of the single helical cut have already been illustrated and are not repeated herein; note that thanks to the detail of following a helical cutting direction, it is possible to extract an entire length of the portion of pipe P without any need to cut it into several parts, exploiting the spring form assumed thereby after the cut.

It is however possible to cut a plurality of helical cuts, such as to obtain a plurality of distinct helically-developing pieces.

For example, during each of the first and second part of step b, where the first cut is on the wall surrounding the first volume V1, followed by the cut surrounding the second volume V2, four helical cuts can be made (four for each piece), such as to obtain in all eight distinct pieces having a helical shape.

In an alternative embodiment, the through-cuts are substantially parallel to the longitudinal central axis of the portion of pipe P and are angularly distanced with respect to the central axis.

Returning to the previous example, though applying it to the present mode, if during each of the first and second part of the step b fourth straight cuts are made in each length, ideally distanced by 90° to one another, in all eight distinct pieces are obtained, having a tile-shape with a cylindrical progression.

Speed is an advantage of this mode.

Preferably whichever cutting mode used, the through-cuts are carried out from inside towards the outside of the portion of pipe, passing through the wall from side to side (as in the case of the use of the machine 1 of the invention), such that during the cut the terrain T in which the portion of pipe P is included is not involved.

The second version (not illustrated in the figures) of the first embodiment of the method, specially provided for the shorter pipes, is like the first version except for the fact that the obturating means O is not used and that the portion of pipe P is not separated into two lengths and the inside of which is not divided into two volumes.

On the contrary, step b is carried out in a single solution by making the through-cut or cuts in the wall starting from the second end P2 up to the first end P1 of the portion P, without any need to displace the worksite from the first cavity S1 to the second cavity S2.

In other words, each through-cut extends over all the length of the portion of pipe P.

If a single helical cut is made, the whole buried portion P can be directly extracted in a single piece with a single removal operation.

If the cuts for example were four in number, the distinct pieces obtained would be four in number and would be removed for example singly directly by the first cavity S1 with the modes already explained.

The second version can be used for longer portions of buried pipe P as long as sufficiently powerful extraction means are available for extracting separate long pieces.

The second embodiment of the method is particularly provided for removing portions of pipes P which exhibit significant bends so as to assume an upturned trapezoid shape (without the larger side, obviously), as shown in FIGS. 7, 9 and 10.

Frequently the shape of the pipe is made necessary, during laying, by the fact that a geographical and/or hydrographical obstacle has to be overcome, of limited width but having a depth (such as the narrow water course F of FIGS. 7, 8 and 10).

Note that in FIGS. 7-10 the position of the cavities S1, S2 and the orientation of the portion of pipe P are inverted with respect to the preceding figures, for reasons of ease of illustration.

Further, note that the figures also serve in the following for explaining the functioning of the machine 1 and other components of a removal system 100.

The second embodiment is particularly suitable for a case of a portion of pipe with significant bends because it includes the oft-cited cutting step b being actuated to successively separate longitudinal sections of the buried portions of pipe P, making through-cuts in each able to separate the wall of the portion of pipe P which surrounds each section into distinct pieces, and removing the pieces one at a time, transporting them away and removing them from the terrain T through one of the above-cited first and second cavity S1, S2 (in the figures, the second cavity S2).

Thus, as the portion P is removed section by section, no difficulties arise due to the resistance which the terrain T would offer to the drawing of the curved and relatively long pieces which are buried in the terrain T.

Preferably, in actuating the second embodiment of the method, the separation and removal in succession of the portion of pipe P are carried out in the following ways:

e. the first section S which is cut and removed includes a terminal edge of the portion P of pipe comprised in the first end P1 of the portion of pipe;

f. a plurality of through-cuts are made on the wall of the portion of pipe 1 going from the terminal edge and for a given length of the portion, such as to define a plurality of pieces of wall having a single free end at the terminal edge and having a length which defines a length of the first section S;

g. a closed through-cut is carried out, comprised in a transversal plane to the portion of pipe P, at a distance from the terminal edge which substantially corresponds to the length of the section S, such as to separate into a plurality of distinct pieces the wall of the portion of pipe which circumscribed the second and such as to define a new terminal edge.

After which, as already explained herein above, the distinct pieces obtained are time by time transported away (for example with a carriage 7, represented in FIGS. 7, 8 and 9, which will be described in the following) and brought out of the terrain T.

Steps f. and g. are reiterated, applying them to successive sections of the pipe which include the new terminal edge time by time defined, up to cutting and removing a section of the portion of pipe which includes the second end P2 (schematically indicated in FIG. 10).

Preferably, as the various sections of the portion of pipe P are sectioned into distinct pieces and removed, the underground volume that is being created is flooded with the filler fluid.

In this case, a seal means is provided (identified by the external container denoted by 5 in the figures, which will be described in the following) for sealingly insulating the part of the portion still to be cut from the empty underground volume under formation and which is filled with filler fluid.

The cutting machine of the invention will now be described.

We recall that the cutting machine of the invention, denoted in its entirety by 1 in the accompanying figures (for example FIGS. 11 and 12) includes, in its most general form: a cutting part 11, entirely insertable in said portion of pipe P, comprising one or more cutting devices 41 for making at least a through-cut in the wall of the portion of pipe; and a support part 12, for supporting the cutting part 11, also entirely insertable in the portion of pipe P, and comprising abutting means 31, 32, 33 for contemporaneously abutting, at a plurality of points, an internal surface of the portion of pipe so as to engage the machine 1 to the portion of pipe P to be cut.

Thus the part of support 12 is the one which engages to the portion of pipe P and rests there the weight of the machine 1, while the cutting part 11 is supported thereby and can therefore directly make cuts on the wall of the portion P without interference of engaging and support means.

The machine 1 can be inserted in the portion of pipe P and displaced along it (in the ways described in the following) in order to make the through-cut or cuts to the wall from inside towards the outside.

In the following descriptions will be made of the structure and preferential details first of the support part 12 and then the cutting part 11, the latter being preferably rotatably connected to the support part 12, as will be more fully explained herein below.

The support part 12 can comprise at least a central support frame 30 (for example axially symmetric as in the figures), connected to the cutting part 11, on which central support frame the aforementioned abutting means 31, 32, 33 are mounted.

For reasons that will become clearer in the following, the support frame 30 is preferably provided with a central passage 300.

The abutting means can comprise at least three abutting elements destined to contemporaneously abut the internal surface of the portion of pipe P in three engaging points, and arranged angled with respect to a central axis C1 of the frame (in practice they are arranged radially with respect to the axis C1).

The angle between the abutting elements is selected such that the contemporaneous abutting of the abutting elements 31, 32, 33 and internal surface of the portion P is ensured, apart from the support, also of an antirotational block of the support part 12 with respect to the portion of pipe P.

In this way, the machine 1 can be made to slide along the longitudinal development of the buried portion P, in order to make the cuts, and at the same time the antirotational block enables reliability in the carrying-out of the cuts and because there is a fixed reference and also because there are no random rotation movements which prejudice the carrying-out of the cuts.

The abutting elements 31, 32, 33 are preferably angled such as to be equidistant, i.e. crossed by relative planes located at 120° from one another.

In the preferred embodiment of the machine 1, represented in FIGS. 11 and 12, each abutting element comprises at least a pair of arms 31, 32 (but preferably two pairs, parallel as illustrated in the figures) each having a respective end connected to the central frame 30 by means of an internal rotational coupling 310, 320 and the other two respective ends connected to one another and to a wheel 33 by means of at least an external rotational coupling 330.

The internal rotational couplings 310, 320 of each connecting element are mutually movable along an axis that is parallel to the central frame axis C1 and are connected to one another by means of elastic biasing means for urging them together, with the rotation axes of the rotational couplings 310, 320, 330 and the wheels 33 being perpendicular to the axis of the frame C1.

Clearly the wheels 33 enable the machine 1 to slide along the internal surface of the buried portion P and can be made of steel or nylon or any other suitable material.

The configuration is provided to enable an adapting of the machine 1 to the dimensions of the transversal section of the portion of pipe P, varying continuously the distance between wheels 3 and frame 30.

In detail, regulating means 34 (represented by the knobs indicated in the figures) can be connected to each pair of internal rotational couplings 310, 320 such as to predetermine (by command of the operator) a distance between the internal rotational couplings, which is a function of the diameter of the portion P to be cut, with the internal rotational couplings subjected at all times to the elastic recall means.

In practice, the adjusting means 34 can be of a type which predetermines a minimum distance between the internal couplings 310, 320 (which corresponds to a maximum distance of the wheel 33 from the frame 30).

In this way, if the portion of pipe exhibits small variations in diameter, due for example to the above-mentioned ovalisation, the abutting elements 31, 32, 33 self-adapt so that the support part 12 (and therefore the machine 1) does not lose perfect engagement with the internal surface of the walls of the buried portion P.

In practice, if in a transversal section the aperture of the portion P reduces for example with respect to a transversal direction, the internal couplings 310, 320 of one of more abutting elements can split apart (with the wheel or wheels 33 nearing the frame), enabling the machine 1 to pass beyond the section, then to return to the predetermined distance on action of the elastic recall means once the aperture of the portion P has returned to the normal dimensions.

In the preferred embodiment of the machine 1, illustrated in the appended tables of drawings, the support part 12 is in practice formed by two components arranged in series and fixed to one another; the structure of which is the one described above for the support part in the generalities thereof, i.e. each component comprises a central frame 30 and a plurality of abutting elements 31, 32, 33 arranged in spoke-fashion with respect thereto, comprising the arms, the wheels, the elastic recall means and the adjusting means configured as explained herein above.

The cutting part 11 of the machine 1 is connected to the support part 12, preferably frontally and rotatably.

In the essential aspects thereof, the cutting part 11 can comprise a connecting and support structure 40, connected to the support part 12, and wherein the cutting means comprise at least one cutting device 41 mounted on the connecting and support structure 40 and able to make at least a cut in the wall of the portion of pipe P, from inside towards outside, passing through the wall from side to side.

If the cutting devices are a plurality (for example four as in the accompanying figures), they are preferably mounted on the connecting structure 40 in such a way as to be angularly distanced with respect to a central structure axis C2 which passes through the connecting and support structure 40.

In practice, the cutting devices 41 have a radial arrangement with respect to the axis of the structure C2.

For reasons of functioning efficiency and constructional simplicity, the axis of structure C2 is preferably coincident with the axis of the frame C1 to define a central machine C axis, with the connecting and support structure 40 of the cutting part 11 which is connected rotatably to the frame 30 of the support part 12 with respect to the central axis of the machine C.

In this way, when the machine 1 is inside the buried portion P to be removed, with the central axis C substantially coinciding with the axis of the portion P, in substantially straight parts thereof, or in any case substantially tangential, the support part 12 engages antirotationally with the walls of the portion P, with sliding possibility in the direction of the length thereto, and the cutting part can perform both straight cuts, keeping the cutting part still with respect to the support part, and curved cuts, rotating the cutting part with respect to the support part.

In practice, the machine 1 can be used both for carrying out the above-mentioned first cutting mode in which the through-cuts are substantially parallel to the central longitudinal axis of the portion of pipe P, and the second mode where the through-cuts have a helical development with respect to the central axis of the portion of pipe.

Further, with the rotation of the cutting part 11 with respect to the support part 12, when the machine 1 is not moved along the buried portion P, the above-cited closed transversal cuts (for example circular) can be made, which serve to cut off the pieces of wall or to divide the portion P into separate lengths (see the description of the method).

In order to activate the cutting part 11 in rotation with respect to the support part 12 rotation activating means are provided, preferably formed by: a cogged circular crown 401 mounted on the connecting and support structure 40, symmetrical with respect to the axis of structure C2, and positioned in front of the frame 30 of the support part; a pinion 402 for rotatingly activating the crown 401; and one or more electric motors 403 (with possible gear reducers and other accessory means as required) connected to the pinion 402 such as to activate it, the motor 403 being, mounted on the support part 12 of the machine 1.

As some of the pipes to be removed are old gas ducts (realised for example in the 1960s) which might contain residues of explosive substances, the cutting devices 41 are preferably of a type able to make cold cuts, in particular of the water-jet type, each comprising a cutting nozzle 410 for dispensing the cutting liquid.

The water-jet devices are of known type, even though not in combination with other elements of the invention, and will therefore not be further described in detail, as it is sufficient to note that they include the supply of water and supply of an abrasive powder substance which are blended in a mixing chamber (for example the powder substance is drawn by Venturi effect following the inlet of the water) and the cutting liquid dispensed comprises the mixture of the water and substance at a high pressure (such as 6000 bar).

The central passage 300 of the support frame 30, which crosses all the support part 12 up to the connecting and support structure 40 of the cutting part, serves to accommodate a water supply tube (which can be made of a metal material, very resistant and provided with some flexibility), which is coupled rotatably to the cutting part 11 and is connected to the cutting device or devices 41 (with the modes as shown by way of example below).

To obtain an effective cut using water-jet devices the distance between nozzles 410 (or rather the outlet openings of the jet) and the wall must be comprised within a given range, preferably about 0.5 cm, because the jet of cutting liquid rapidly loses energy.

With the aim of using the machine 1 in portions of pipe P with different diameters, it can be included that each cutting device 41 is slidable in a perpendicular direction to the axis of the structure C2 (i.e. in a radial direction) such as to be able to vary the distance between the cutting nozzle 410 and the structure axis C2, which implies the adjustment of the distance between the nozzle 410 and the wall to be cut.

In order to ensure that the distance is not only adjusted but constant during the carrying-out of the cuts while the machine is drawn along the buried portion P, and further that it self-adapts to compensate for the above-mentioned ovalisation, the following can be comprised.

At least an abutting member 42 for each cutting device 41 is mounted solidly to the respective cutting device 41, the abutting member 42 being suitable for abutting the internal surface of the wall of the portion of pipe P and being arranged with respect to the cutting device such that as long as the abutting member 42 abuts the internal surfaces, the cutting nozzle 410 is at a constant cutting distance with respect to the internal surface.

Further, an elastic contrast means is connected to each cutting device 41 such as to force it to slide distancingly from the structure axis C2.

In still more detail, each abutting member can comprise a bracket radially slidable to the connecting and support structure 40, located substantially about the relative cutting device as it is equipped with a passage for crossing the nozzle 410, and further equipped with one or more abutting elements 420 mounted on the external face, projecting with respect to the nozzle 410, which can comprise a ball confined freely rotatingly in a respective seating, which ball is arranged such that the distance between the contact point with the wall to be cut and the above outlet opening of the cutting liquid is constant and is the optimal distance for the performing of the cut.

Given that the cutting devices 41 are radially slidable but require supply with water, for each thereof at least a water delivery tube 43 can be provided, mounted in the cutting part 11 (see in particular FIGS. 11 and 12), which tube 43 is flexible and spiral, with a parallel axis to (or coinciding with) the axis of the structure C2, such as alternatingly to be able to stretch out or wind according to whether the respective cutting device 41 is distancing from or nearing the axis C2.

Each delivery tube 43 is connected to the supply tube via a tubing further comprising, for example, the cross connections indicated by 430 in the figures.

In the following, FIGS. 1-3 are once more used to explain how the cutting machine 1 is usable in the methods of the invention, the steps of which are not repeated here as they would be superfluous.

FIG. 2 schematically denotes the machine 1 inserted in the portion of pipe P to be removed from the terrain T, which is connected to the locomotion means thereof located in the first cavity S1, by means of a motion transmission line which is rigid in the length direction, for example a transmission tube formed by a series of metal pigments screwed to one another at the threaded end.

In fact, in order to carry out effective and precise cuts, especially by means of water jet devices, it is necessary to predetermine very carefully the velocity of displacement of the devices along the buried portion which is sectioned.

Further, given that this velocity, which is the drawing velocity of the whole machine 1, must be constant and low (for example 10 cm per minute) such as to have the certainty of always efficiently cutting the wall from side to side, then the locomotion means can comprise a rack located in the first and/or the second cavities S1, S2, on which a pinion enmeshes, activated by a suitable motor, borne by a carriage Z1 which slides above and along the rails Z2 located in the first and/or the second cavity S1, S2, and arranged parallel to the portion of pipe P to be removed (and parallel to the rack, clearly).

The above-mentioned water supply tube, the pneumatic supply tubes of the abrasive substance, the cavities for the supply of the electrical devices of the machine (such as the machine) and any air breather tubes to allow for the Venturi effect (and if necessary tubes for supply of oil to hydraulic means) can be all arranged parallel and be connected to the above-mentioned transmission tube, and possibly to rest on a series of rollers arranged between the rails Z2.

In this case, the carriage Z1 bears a container which comprises: tanks for the abrasive substance, compressors, pumps for supplying the water at high pressure, etc. . . . while for example the electric generator group Z3 travels laterally to the container.

The above-mentioned machine 1 can in itself actuate the first embodiment of the method in both the versions (with or without the obturating means O).

To actuate the second embodiment, use of the machine 1 is flanked to the use of further means that altogether go to form a removal system 100.

The removal system 100, which by the way is specially set up for actuating the second embodiment of the method, is illustrated in the main components thereof in FIGS. 13-15 and comprises:

the cutting machine 1 of the invention;

an external container 5 shaped as a beaker, suitable for containing the cutting machine 1, having transversal dimensions that are larger than those of the portion P of pipe, and comprising a lateral wall, closed at an end by a bottom wall 51 and having at an opposite end an opening 50 suitable for engaging with the wall of the portion of pipe P such that the lateral wall of the container 5 can circumscribe a section S of the portion P of pipe which includes an end P1, P2 thereof and such that the inside of the container 5 communicates with the inside of the portion of pipe;

at least a gripping device 6, suitable for being inserted internally of the container 5, and comprising gripping means 60, 61 for retaining the distinct pieces obtained upon having made the cuts in the wall of section S of the portion of pipe by means of the cutting machine 1;

at least a transport shuttle 7, movable internally of the buried pipe, and suitable for collecting from the gripping device 6 the distinct pieces and for transporting them out of the portion of pipe P through the opposite end to the end to which the beaker-shaped container 5 is engaged;

means for displacing the beaker container 5 and the gripping device 6 inserted therein;

means Z1, Z2 for moving the cutting machine 1 into the container and into the portion of pipe; and means, including a transport tube 8, for releasing filler material into the underground volume left by the portion of pipe P separated into the distinct pieces transported outside by the shuttle.

In detail, as can be seen in FIGS. 13, 14, 15, 18, 19 and 20, the system 100 can comprise transport tube 8 for the filler liquid arranged centrally and axially to the machine 1, the beaker container 5 and the gripping means 6.

In this case, the bottom 51 of the container 5 comprises a single passage for crossing an end portion of the transport tube 8 at which passage the pipe P is rotatably fixed to the bottom 51.

In practice, the walls and bottom of the external container 5 sealingly close on the transport tube 8, such as to fluid-dynamically isolate the inside of the container 5 with respect to the outside except for the passage represented by the transport tube 8 itself.

Obviously the transport tube 8 described above is destined to be fluid-dynamically connected to the mixer station B and to appropriate pumping means.

In order to enable crossing of the transport tube 8 by the filler fluid, the machine 1 will have a central axial passage over the whole length thereof, and the tube for supplying the water will be arranged out-of-axis with respect to the axis C of the machine 1 and fixed to the cutting part 11 with a rotatable coupling, such as to enable rotation of the cutting part 11 with respect to the support part 12.

The external beaker container 5 can comprise, fixed along the edge of the mouth defined by the access opening 50, a plurality of projecting elements 52 inclined towards the axis of the container, distancingly from the lateral wall, subject to the action of elastic contrast means to splitting, which engage the wall of the portion of pipe P once the section to be cut has been received inside the container 5, with the aim of ensuring a good anchoring to the portion P by the container 5 and the other components of the system 100 contained therein, and as a digging means for softening the terrain T about the portion of pipe.

Before describing in detail the structure and internal functioning of the system 100, in the following, with the aid of FIGS. 7-9 it is illustrated how this is usable for actuating the second embodiment of the method, with reference to the preceding description thereof for listing and explaining the steps thereof.

Initially, as illustrated in FIGS. 7 and 8, the system 100 is arranged at the first end of the portion of pipe P2 to be removed, including or not the shuttle 7 which in the figures is illustrated by way of example separated from the rest of the system 100.

Thus, a section S of the buried portion, the machine 1 and the gripping device 6 are in the external container 5 (it will be explained in the following how they are arranged with respect to one another).

The machine 1 can be connected to the carriage Z1 and to the container in the way already described, while the external container 5 and the gripping device 6 are movable thanks to winches or similar displacing means to which they are connected by a cable or other linear means for transmission of motion.

The machine 1 is activated such as to cut the wall of the section S and, in order to do this, the carriage Z1 is pulled, such as to carry out the cuts over all the length of the section S and divide it into distinct pieces (with modes specified in the following), which pieces are initially gripped by the gripping device 6 and then taken in delivery by the shuttle 7 that takes them away towards the second end P2 of portion where they are collected by the personnel working on the second cavity S2.

After this, the machine 1, external container 5 and gripping device 6 are drawn conversely, i.e. at the same device, up to when a new section S of the portion of pipe P, having the terminal edge as a free end, has been housed in the external container or beaker body 5.

During the operation of the preceding paragraph, a buried empty volume is formed downstream of the system 100, which is then filled under pressure by the filler liquid, via the tube denoted by 8 in the figures.

As the system includes the external container 5, the inside thereof (obviously apart from the inside of the transport tube 8) and all the part of the portion of pipe P downstream of the external container 5 are sealed with respect to the filled underground volume.

At this point, the operations of the preceding paragraphs are reiterated, removing a section at a time (see FIG. 9) up to removal of the final section which comprises the second end P2 (see FIG. 10).

In a preferred version of the system 100, illustrated in detail in FIGS. 14, 15 and 16, the gripping device 6 comprises an external body, in a beaker conformation, completely inserted in the external container 5 and connected rotatably thereto with respect to a common central axis, having a tubular lateral wall 64 parallel to the lateral wall of the external container 5 and having an opening 63 opposite the bottom and facing the opening 63 of the container 50.

The body has a bottom 62 facing the bottom of the external container 5 which contains it, at which bottom 62 the rotation mechanism of the body of the gripping device is arranged with respect to the external container (for example comprising a motor and a crown mechanism 65 that is internally cogged/pinion).

The gripping device 6 is preferably mounted in the external container 5 such as to be axially blocked with respect thereto and to be able only to rotate therein.

A passage is afforded in the bottom 62 for the fluid transport tube 8 at which there is a rotatable connection between the body 64, 62 and the transport tube 8.

The gripping device 6 can further comprise a plurality of elongate gripping elements 60, (preferably having a tile shape, or rather a longitudinal sector of a tubular wall), angularly distanced with respect to the common central axis and having a length thereof parallel to the axis, which elongate elements 60 are each connected to the internal surface of the tubular wall 64 by a respective pantograph 61 (for example connected to oil-dynamic actuating means) so as to define said gripping means, in which gripping means elastic retaining means (not illustrated) are further comprised, arranged between each elongate element 60 and the internal surface of the tubular wall 64 and configured such as to engage, by interference fit, the wall of the section S of the portion P of pipe to be cut or said distinct pieces thereof, upon having made the cuts.

In practice, the dimensions of the external container 5 and the gripping device 6 are selected such as when the container 5 engages with the buried portion P the wall of the section S housed therein enters the beaker body of the gripping device, being placed between the tubular wall 64 thereof and the elongate elements 60 (which are preferably four in number and angularly equidistanced), which are parallel to the wall of the section S to be cut.

The wall of the section S inserted in the gap between the tubular wall 64 of the body and the elongate elements 60 is engaged by the elastic retaining means which can be constituted by a plurality of arched members, made of an elastic material such as for example steel, arranged in series both on the external face of the elongate elements and on the internal face of the tubular wall of the beaker body, and having an end fixed to the respective face on which they are arranged and a free curved end in an opposite direction to the openings 63, 50 of the container 5 and the gripping device 6, such that the terminal edge of the section S which enters the gap presses on the convexity of the arched members such that they give way such as to enable insertion, thus elastically loading and pressing together on both the internal and external surfaces of the wall of the second S, such as to engage it by friction interference.

Reference is now made to FIGS. 14, 15, 18, 19 and 20, 21, 22, 23, 24 and 25.

The system 100 is preferably configured such that the external container 5 has an internal volume that is sufficiently long to accommodate in series, starting from the mouth, the gripping device 6, the cutting machine 1 and the means 65 for rotating the gripping device in the container 5.

In practice, in an initial situation (represented in FIG. 21, and also in FIGS. 14 and 15), the section S still to be cut is housed in the container 5 and engaged to the gripping device 6, in the above-described ways, and, in the internal volume rear of the gripping device, in the following the housing volume A, the cutting machine 1 is completely housed and is thus distanced from the gripping device 6 and the section S; rotating means 65 of the gripping device 6 in the container 5 are located behind the machine 1, for example with the interposing of a separating wall 620 with respect to the housing volume, also clearly provided with a passage for the transport tube 8 of the filler fluid, to which the wall is rotatably coupled.

The system 100 is preferably arranged and configured in the following way.

The gripping device has four elongate gripping elements 60 having a same angular distance (not nil) from one another (and each having a circular-progression transversal profile having a shorter length than a right-angle) arranged in such a way that in a front view they are respectively at 12 o'clock, 3 o'clock, 6 o'clock and 9 o'clock of a clock face. In practice, two superposed elements 60 are ideally separated into two symmetrical halves by a vertical plane passing through the central axis of the external container 5, while the other two elements 60 are flanked and ideally divided into two symmetrical halves by a horizontal plane which also passes through the central axis.

The cutting machine 1 has four cutting devices 41, also angularly equidistanced to one another and each equidistanced (ideally by 45 degrees) with respect to the two planes of symmetry cited above in the preceding paragraph (and thus located respectively at half-past one, half-past 4, half-past seven and half-past ten).

To make the cut of the section S, the cutting machine 1 is moved axially in the external container 5, bringing it within the section, such that the cutting devices 41 directly face the wall of the section in the spaces between an elongate element 60 and the other, and can be activated while the machine is drawn towards the mouth 50 of the beaker container 5 (see FIG. 22).

The lateral wall 64 of the gripping device is preferably made of (or internally clad with) a very hard material (such as Widia), especially in the case of use of water jet technology so that the jet, after having passed through the wall of the section S, does not damage the gripping device wall.

Figure 23:
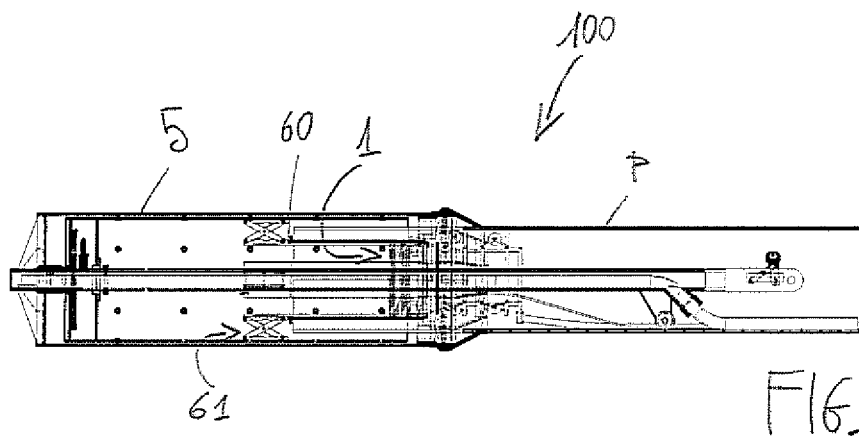
Figure 24:
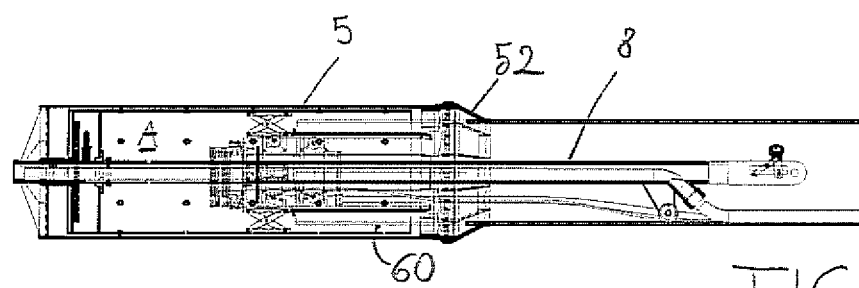

FIG. 23 represents the moment in which the machine has finished making four through-cuts in section S, and the cutting devices 41 have passed beyond the elongate elements 60.

In this position, the machine 1 is astride the gripping device 6, the external container 5 and the portion of pipe P, with the cutting devices 41 between the front opening 63 of the gripping device and the mouth or opening 50 of the external beaker container 5.

At this point, the cutting part 11 of the machine 1 rotates about the axis C and cuts the cut wall of section S of buried portion P into four distinct parts.

The distinct pieces, denoted by 10 in the figures in which they are collected by the shuttle 7, for example in FIG. 15, do not fall because they are supported and retained in position by the elastic retaining means located between the respective elongate elements 60 and the tubular wall 64 of the gripping device 6.

After this, the machine 1 is retracted up to returning into the rear housing volume A.

The pantographs 61 are activated to split the elongate gripping elements 60 (nearing them to the tubular wall 64) such as to separate the distinct pieces 10 retained thereby, annulling the structural resistance they have when contiguous, due to the key-turning principle, and such as to obtain space for the following operations.

To explain exactly how the collection and transport outwardly of the distinct pieces 10 is done, it will be necessary to give a detailed description of the structure and functioning of the shuttle 7, but before explaining how the device 5 makes the various distinct pieces available to the shuttle 7 so that it can collect them.

The gripping element 60 located superiorly (at twelve o'clock, to use the terminology specified above) is lowered by the respective pantograph 61, with the relative distinct piece 10, into a delivery position.

The transport shuttle, in known ways explained in the following, takes the piece 10 in, and takes it away from the elongate element 60 which, freed of the piece 10, returns into the original position thereof.

Figure 25:
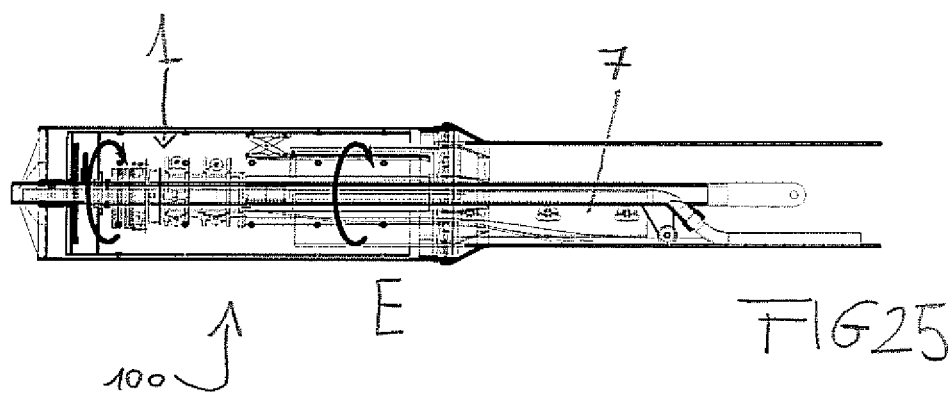

At this point, the rotating means 65 of the gripping device 6 rotate the gripping device 6 by 90°, which can freely occur as the gripping device has rotatable couplings with the beaker container 5 and also with the transport tube 8 of the filler liquid (see FIG. 25).

In practice, a gripping element 60 which was located laterally is brought to 12 o'clock and this can occur without the respective distinct piece 10 falling by virtue of the elastic retaining means and the arrangement thereof in the gripping device 6.

Thus the passage of delivery is newly performed between the device 6 and the shuttle 7 of the piece 10 located superiorly, and the above-described operations are reiterated up to when all four pieces 10 have been accommodated by the shuttle 7, at which the shuttle 7 proceeds to transport them out of the portion of pipe P, through one of the two ends thereof (the one denoted by P2 in the example represented in the drawings) such that they reach one of the cavities S1, S2 and are definitively removed from the terrain T.

Then the various steps of the second embodiment of the method are reiterated, using the removal system 100 in the ways already detailed herein above.

There follows a description of the preferred version of the transport shuttle 7, with the aid in particular of FIGS. 13, 17, 18, 19 and 20, but also in reference to FIGS. 14 and 15.

The transport shuttle 7 comprises a support carriage 71 able to slide in the portion of buried pipe P between the end P2 to which it takes the distinct pieces 10 of wall such as to remove them, and a front position to the elongate elements 60 of the gripping device 6, and further comprises a removing and collecting drawer 72 able to house a plurality of distinct cut pieces 10, arrangeable parallel to the portion of pipe P and the above-cited elongate elements 60.

When the shuttle 7 is in the front position, the gripping element 60 positioned at 12 o'clock (or it may have lowered) and the shuttle can be activated to receive the piece of wall 10 resting on the element 60 (more precisely on the elastic means).

The drawer 72 is able to slide with respect to the carriage 71 between an extending collecting position E (see FIGS. 19 and 25) in which it is projectingly located with respect to the carriage 71, and a retracted collecting position, and has dimensions such as to be able to surround an elongate element 60 bearing a respective piece 10 of section wall S located above it.

Further, the shuttle 7 comprises hooking means (not illustrated and described in the following in an embodiment) mounted on the drawer 72 and able to hook the piece of wall 10 following the displacement of the drawer into the collecting position E, and able to draw the piece 10 while the drawer 72 displaces towards the collecting position up to releasing it restingly into the drawer 72 following arrival thereof in the collecting position.

In practice, the drawer 72 can project beyond the carriage 71 such as to reach the upper elongate element 60 with the load, and surround it (as the drawer preferably is substantially tubular in shape, including a bottom for the support of the pieces), at which the hooking means hooks the piece to be collected, which is slid above the elongate element while the drawer retreats towards the collecting position, up to beyond the front edge of the element 60 such that the piece falls onto the bottom of the drawer 72.

The drawer 72 must be able to contain in stacking fashion all the pieces 10 into which the section S of wall is cut, i.e. four pieces in the above-described example.

As the shuttle 7 has to reach inside the beaker container 5, it has to pass above the transport tube 8 for the filler liquid, and to do this it can be saddle-shaped, such as the one shown in the figures, having a gully or a lower crook which receives the tube without friction interference and enables the free axial sliding of the carriage 71.

In the figures, the carriage has a periphery defined by a deformed tubular wall forming a saddle and exhibits slots to enable wheels located internally to contact the walls of the portion of pipe P so that it can slide.

The shuttle 7 can be self-propelling, and thus include a motor, or can be moved by actuating means located in the worksite S2 and connected to the carriage 71 by drive transmission means for the purpose (for example comprising jointed rigid rods).

The hooking means can comprise one or more pendulums, each having an end connected to the upper part of the carriage 71 and having a hook at the other end.

The pendulums are foldable towards the inside of the drawer 72, following the abutment thereof with the piece 10 to be collected, when the piece 10 is moved towards the extended position E thereof, then to straighten by force of gravity when they have passed beyond the further edge of the piece 10, such as to engage the edge with the hook.

Following this, when the drawer is returned into the collecting position, the piece 10 collected is unhooked and falls onto the bottom of the drawer.

The invention claimed is:

1. A method for removing from a terrain a buried pipe portion of a substantially cylindrical pipe made of a ductile material and suitable for use in pipelines including oil pipelines, water pipelines, and gas pipelines, which method comprises steps of:
   a) digging at least a first excavation in the terrain, at a first longitudinal end of the buried pipe portion to be removed, to make the first longitudinal end accessible;
   b) making in a wall of the buried pipe portion to be removed, through-cuts having a helical form with respect to a central longitudinal axis of the buried pipe portion to be removed so as to form helical strips;
   c) taking the helical strips and removing the helical strips from the terrain, passing the helical strips through the first excavation; and
   d) obstructing an underground volume that contained the removed helical strips and the first excavation with filler material which is initially fluid, and is able to solidify over time,
   wherein during step (a) a second excavation is made at a second longitudinal end of the buried pipe portion to be removed;
   wherein, before performing step (b), the following steps are carried out:

providing an obturating means having a width that is equal to a width of a section of the buried pipe portion to be removed and having a respective length;
   making at least one through-cut in a wall of the section of the buried pipe portion to be removed, at a position to be obstructed by the obturating means, wherein the at least one through-cut has a length that is equal at least to an effective or operative length of the obturating means; and
   inserting the obturating means in the buried pipe portion to be removed, placing the obturating means at the position of the section of the buried pipe portion to be removed at which the at least one through-cut has been made, activating the obturating means such that obturating means adhere to the internal surface of the pipe to sealingly obstruct the section of the buried pipe portion to be removed and to define, in the buried pipe portion to be removed, a first volume and a second volume that are fluid-dynamically isolated from each other by means of the obturating means;
   and wherein
   a first part of step (b) is carried out by making a closed through-cut, which intersects said at least one through-cut made at the section of the buried pipe portion to be removed obstructed by the obturating means, to section the buried pipe portion to be removed by separating a part thereof which contains the first longitudinal end and is coextensive with the first volume from a part which contains the second longitudinal end and is coextensive with the second volume and the section of the buried pipe portion to be removed which is obstructed by the obturating means;
   thereafter, the first part of step (b) further includes making at least an additional through-cut on the wall circumscribing said first volume, the additional through-cut extending from said closed through-cut to the first longitudinal end, thereby forming one of said helical strips, the additional through-cut being one of the through-cuts having a helical form;
   thereafter, filler fluid is poured into the first volume and, at the same time or subsequently, a first part of step (c) is carried out, wherein the one of said helical strips obtained in the first part of step (b) is removed from the terrain;
   thereafter, a second part of step (b) is carried out, in which at least a further through-cut is made on the wall which circumscribes the second volume, the further through-cut extending from the closed through-cut to the second longitudinal end, thereby obtaining a further one of said helical strips, the further through-cut being another one of the through-cuts having a helical form; and
   thereafter, the obturating means is removed from the buried pipe portion to be removed, by being passed through the second longitudinal end; and then
   a second part of step (c) is carried out, in which the further one of said helical strips is removed from the terrain and, at the same time or subsequently, filler fluid is poured into the second volume.

2. The method of claim 1, wherein said additional through-cut has a helical form with respect to a central longitudinal axis of the buried pipe portion to be removed, to obtain said one of said helical strips.

3. The method of claim 2, wherein step (b) is carried out by making a plurality of through-cuts on the wall of the buried pipe portion to be removed to divide the buried pipe portion to be removed into a plurality of distinct pieces.

4. The method of claim 3, wherein the through-cuts of said plurality of through-cuts are parallel helical through-cuts.

5. The method of claim 1, wherein the through-cuts including the at least one through cut, the closed through cut, the additional through-cut and the further through-cut are all carried out from inside towards outside of the buried pipe portion to be removed, passing through the wall, of the buried pipe portion to be removed, from side to side.

6. The method of claim 1, wherein the through-cuts including the at least one through cut, the closed through cut, the additional through-cut and the further through-cut collectively extend over all the length of the buried pipe portion to be removed from the first longitudinal end to the second longitudinal end thereof.

7. The method of claim 1, further comprising: successively separating longitudinal sections of the buried pipe portion to be removed, making in at least one of the longitudinal sections through-cuts able to separate, into distinct pieces, the wall of the at least one of the longitudinal sections, and removing, one after another, the distinct pieces from the terrain through one of the first excavation and the second excavation.

8. The method of claim 7, wherein separation and removal in succession of the longitudinal sections of the buried pipe portion to be removed are carried out as follows:
  e. a first one of the longitudinal sections which is cut and removed includes a terminal edge of the buried pipe portion to be removed located at the first longitudinal end of the buried pipe portion to be removed;
  f. a plurality of through-cuts are made in the wall of the first one of the longitudinal sections going from the terminal edge and for a given length of the buried pipe portion to be removed, to define a plurality of pieces of wall having a single free end at the terminal edge and having a length which defines a length of the first one of the longitudinal sections;
  g. a closed through-cut is carried out, comprised in a transversal plane to the buried pipe portion to be removed, at a distance from the terminal edge which substantially corresponds to the length of the first one of the longitudinal sections, to separate into a plurality of distinct pieces the wall of the first one of the longitudinal sections, the closed through-cut in part forming a terminal edge of a second one one of the longitudinal sections; and
  steps (f) and (g) are reiterated, for successive longitudinal sections of the buried pipe portion to be removed.

9. A cutting machine for making cuts in a wall of a buried pipe portion to be removed, comprising:
  a cutting part, entirely insertable in said buried pipe portion to be removed, comprising cutting means for making at least a through-cut in the wall of the buried pipe portion to be removed; and
  a support part, for supporting the cutting part, also entirely insertable in the buried pipe portion to be removed, and comprising abutting means for contemporaneously abutting, at a plurality of points, an internal surface of the buried pipe portion to be removed so as to engage the machine to the buried pipe portion to be removed, wherein:
  the cutting part comprises a connecting and support structure which is rotatably connected to the support part, whereby the machine makes curved cuts in the wall of the buried pipe portion to be removed, wherein the cutting means comprise a plurality of cutting devices mounted on the connecting and support structure in such a way as to be angularly distanced with respect to a central axis which passes through the connecting and support structure and able to make at least a cut in the wall of the buried pipe portion to be removed, from inside towards outside, passing through the wall from side to side, wherein each cutting device is a liquid-jet cutting device and comprises a cutting nozzle for dispensing a cutting liquid and wherein each cutting device is slidable in a direction perpendicular to the central axis, so as to be able to vary the distance between the cutting nozzle and the central axis,
  and comprising at least an abutting member for each cutting device, the abutting member being mounted solidly to the respective cutting device, the abutting member being provided for abutting the internal surface of the buried pipe portion to be removed and being arranged with respect to the cutting device in such a way that, as long as the abutting member is abutting with the internal surface of the wall of the buried pipe portion to be removed, the cutting nozzle is at a constant cutting distance with respect to said internal surface, and wherein a biasing means is connected to each cutting device in such a way as to urge such cutting device to slide distancingly from the central axis.

10. The machine of claim 9, wherein the support part comprises a central support frame connected to the cutting part, on which central support frame the abutting means are mounted, which abutting means comprise at least three abutting elements destined to contemporaneously abut the internal surface of the buried pipe portion to be removed at three engaging points, and arranged with an angulation with respect to a center axis of the central support frame which passes through the central support frame, the angulation between the at least three abutting elements being chosen in such a way that the contemporaneous abutting between the at least three abutting elements and the internal surface of the buried pipe portion to be removed ensures, apart from support, also an antirotational block of the support part with respect to the buried pipe portion to be removed.

11. The machine of claim 10, wherein each of the at least three abutting elements comprises at least a pair of arms each having a respective end connected to the central support frame by means of an internal rotational coupling and the other two respective ends connected to one another and to a wheel by means of at least an external rotational coupling, the internal rotational couplings of the at least three abutting elements being mutually movable along an axis that is parallel to the center axis of the central support frame and being connected to one another by means of elastic biasing means for urging the internal rotational couplings together, with the rotation axes of the internal rotational couplings, the external rotational couplings and the wheels being perpendicular to the center axis of the central support frame.

12. The machine of claim 10, wherein the central axis of the connecting and support structure coincides with the center axis of the central support frame so as to define a central machine axis, and wherein the connecting and support structure of the cutting part is rotatably connected to the central support frame, with respect to said central machine axis.

13. The machine of claim 9, wherein at least a water delivery tube for each cutting device is mounted in the cutting part, which water delivery tube is flexible and spiral-shaped, with an axis parallel to the central axis of the connecting and support structure, and which water delivery tube alternatingly unwinds or coils up according to whether the respective cutting device moves away from or nears the central axis of the connecting and supporting structure.

14. A removal system for removing from a terrain a buried pipe portion, usable in oil pipelines, water pipelines, and gas pipelines, comprising:
- at least a cutting machine according to claim 9, said cutting machine being operable to make cuts in the wall of the buried pipe portion to be removed so as to form a plurality of distinct pieces of the buried pipe portion to be removed;
- an external container shaped as a beaker, suitable for containing the cutting machine, having transversal dimensions that are larger than those of the buried pipe portion to be removed, and comprising a lateral wall, closed at an end by a bottom wall and having at an opposite end an opening suitable for engaging with the wall of the buried pipe portion to be removed, the lateral wall of the external container circumscribing a section of the buried pipe portion to be removed which includes one of two longitudinal ends of the buried pipe portion to be removed, the inside of the external container communicating with the inside of the buried pipe portion to be removed;
- at least a gripping device, suitable for being inserted internally of the external container, and comprising gripping means for retaining the distinct pieces formed by means of the cutting machine;
- at least a transport shuttle, movable internally of the buried pipe portion to be removed, and suitable for collecting from the gripping device the distinct pieces and for transporting the distinct pieces out to said one of said two longitudinal ends;
- means for displacing the external container and the gripping device inserted therein;
- means for moving the cutting machine into the external container and into the buried pipe portion to be removed; and
- means for releasing filler material into the underground volume vacated by the buried pipe portion to be removed.

15. The system of claim 14, wherein the gripping device comprises a beaker-shaped external body completely inserted in the external container, comprising a tubular lateral wall and rotatably connected to the external container with respect to a common central axis, having an opening facing the opening of the external container, and comprising a plurality of elongate gripping elements, angularly distanced from each other with respect to the common central axis and extending parallel to the common central axis, which elongate gripping elements are each connected to an internal surface of the tubular lateral wall by a respective pantograph so as to define said gripping means, said gripping means further comprising elastic retaining means, arranged between each elongate gripping element and the internal surface of the tubular lateral wall and configured to engage, by interference fit, the wall of the section of the buried pipe portion to be removed or said distinct pieces thereof.

16. The system of claim 15, wherein the transport shuttle comprises a support carriage suitable for running inside the buried pipe portion to be removed, between said one of said two longitudinal ends, and a position frontal to the elongate gripping elements of the gripping device, and wherein the transport shuttle further comprises a collecting drawer for housing a plurality of distinct cut pieces, arrangeable parallel to the buried pipe portion to be removed and said elongate gripping elements, which drawer is configured to slide with respect to the support carriage between an extended collecting position in which the drawer is located projectingly with respect to the support carriage, and a retracted depositing position, the transport shuttle further comprising hooking means mounted on the drawer and configured to hook any given one of said distinct pieces upon the displacement of the drawer into the collecting position, and able to draw said any given one of said distinct pieces while the drawer displaces towards the retracted depositing position thereof up to releasing said any given one of said distinct pieces restingly in the drawer, upon arrival thereof in the retracted depositing position.

17. The system of claim 14, comprising a transport tube for the filler liquid arranged centrally and axially to the cutting machine, the external container and the gripping means of the gripping device, wherein the bottom of the external container comprises a unique passage for crossing a portion of end of the transport tube at which passage the transport tube is rotatably fixed to the bottom.

* * * * *